United States Patent
Ponnuswamy et al.

(10) Patent No.: US 10,587,621 B2
(45) Date of Patent: Mar. 10, 2020

(54) SYSTEM AND METHOD FOR MIGRATING TO AND MAINTAINING A WHITE-LIST NETWORK SECURITY MODEL

(71) Applicant: Cisco Technology, Inc., San Jose, CA (US)

(72) Inventors: Kannan Ponnuswamy, Murphy, TX (US); Navneet Yadav, Cupertino, CA (US); Arvind Chari, New York, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 182 days.

(21) Appl. No.: 15/794,908

(22) Filed: Oct. 26, 2017

(65) Prior Publication Data

US 2018/0367541 A1 Dec. 20, 2018

Related U.S. Application Data

(60) Provisional application No. 62/520,862, filed on Jun. 16, 2017.

(51) Int. Cl.
*H04L 29/06* (2006.01)

(52) U.S. Cl.
CPC ............ *H04L 63/101* (2013.01); *H04L 63/20* (2013.01)

(58) Field of Classification Search
CPC ............................. H04L 63/101; H04L 63/20
See application file for complete search history.

(56) References Cited

U.S. PATENT DOCUMENTS 5,204,829 A 4/1993 Lyu et al.
6,763,380 B1 7/2004 Mayton et al.
(Continued)

FOREIGN PATENT DOCUMENTS

CN 105471830 4/2016
CN 105721193 6/2016
(Continued)

OTHER PUBLICATIONS

Ting-Fang Yen, Alina Oprea, Kaan Onarlioglu 'Beehive: Large-Scale Log Analysis for Detecting Suspicious Activity in Enterprise Networks' ACSAC '13 Dec. 9-13, 2013, New Orleans, ACM, pp. 199-208 (Year: 2013).*

(Continued)

*Primary Examiner* — Catherine Thiaw
(74) *Attorney, Agent, or Firm* — Polsinelli PC

(57) ABSTRACT

Systems, methods, and computer-readable media for migrating to and maintaining a white-list network security model. Network traffic identified from permit-all access logs can be analyzed to determine whether it should be white-listed, and if so, a specific permit-access, without logging, policy is generated for the identified network traffic. The addition of specific permit-access policies is repeated on permit-all access logs, at which point, permit-all access policy is converted into deny-all access. In some examples, a system or method can obtain hit counts, from both hardware (eg: TCAM) and software tables, for the specific permit-access policy to determine existence of identified network traffic over a period of time. After analyzing hit counts, the specific permit-access policy can either continue to exist or be removed to maintain a white-list network security model.

17 Claims, 13 Drawing Sheets

(56) References Cited

U.S. PATENT DOCUMENTS

| | | |
|---|---|---|
| 7,003,562 B2 | 2/2006 | Mayer |
| 7,089,369 B2 | 8/2006 | Emberling |
| 7,127,686 B2 | 10/2006 | Drechsler et al. |
| 7,360,064 B1 | 4/2008 | Steiss et al. |
| 7,453,886 B1 | 11/2008 | Allan |
| 7,505,463 B2 | 3/2009 | Schuba et al. |
| 7,548,967 B2 | 6/2009 | Amyot et al. |
| 7,552,201 B2 | 6/2009 | Areddu et al. |
| 7,609,647 B2 | 10/2009 | Turk et al. |
| 7,619,989 B2 | 11/2009 | Guingo et al. |
| 7,698,561 B2 | 4/2010 | Nagendra et al. |
| 7,743,274 B2 | 6/2010 | Langford et al. |
| 7,765,093 B2 | 7/2010 | Li et al. |
| 8,010,952 B2 | 8/2011 | Datla et al. |
| 8,073,935 B2 | 12/2011 | Viswanath |
| 8,103,480 B2 | 1/2012 | Korn et al. |
| 8,190,719 B2 | 5/2012 | Furukawa |
| 8,209,738 B2 | 6/2012 | Nicol et al. |
| 8,261,339 B2 | 9/2012 | Aldridge et al. |
| 8,312,261 B2 | 11/2012 | Rao et al. |
| 8,375,117 B2 | 2/2013 | Venable, Sr. |
| 8,441,941 B2 | 5/2013 | McDade et al. |
| 8,479,267 B2 | 7/2013 | Donley et al. |
| 8,484,693 B2 | 7/2013 | Cox et al. |
| 8,494,977 B1 | 7/2013 | Yehuda et al. |
| 8,554,883 B2 | 10/2013 | Sankaran |
| 8,589,934 B2 | 11/2013 | Makljenovic et al. |
| 8,621,284 B2 | 12/2013 | Kato |
| 8,627,328 B2 | 1/2014 | Mousseau et al. |
| 8,676,903 B2 * | 3/2014 | Bansal ............... H04L 51/12 709/206 |
| 8,693,344 B1 | 4/2014 | Adams et al. |
| 8,693,374 B1 | 4/2014 | Murphy et al. |
| 8,761,036 B2 | 6/2014 | Fulton et al. |
| 8,782,182 B2 | 7/2014 | Chaturvedi et al. |
| 8,824,482 B2 | 9/2014 | Kajekar et al. |
| 8,910,143 B2 | 12/2014 | Cohen et al. |
| 8,914,843 B2 | 12/2014 | Bryan et al. |
| 8,924,798 B2 | 12/2014 | Jerde et al. |
| 9,019,840 B2 | 4/2015 | Salam et al. |
| 9,038,151 B1 | 5/2015 | Chua et al. |
| 9,055,000 B1 | 6/2015 | Ghosh et al. |
| 9,106,555 B2 | 8/2015 | Agarwal et al. |
| 9,137,096 B1 | 9/2015 | Yehuda et al. |
| 9,225,601 B2 | 12/2015 | Khurshid et al. |
| 9,246,818 B2 | 1/2016 | Deshpande et al. |
| 9,264,922 B2 | 2/2016 | Gillot et al. |
| 9,276,877 B1 | 3/2016 | Chua et al. |
| 9,319,300 B2 | 4/2016 | Huynh Van et al. |
| 9,344,348 B2 | 5/2016 | Ivanov et al. |
| 9,369,434 B2 | 6/2016 | Kim et al. |
| 9,389,993 B1 | 7/2016 | Okmyanskiy et al. |
| 9,405,553 B2 | 8/2016 | Branson et al. |
| 9,444,842 B2 | 9/2016 | Porras et al. |
| 9,497,207 B2 | 11/2016 | Dhawan et al. |
| 9,497,215 B2 | 11/2016 | Vasseur et al. |
| 9,544,224 B2 | 1/2017 | Chu et al. |
| 9,548,965 B2 | 1/2017 | Wang et al. |
| 9,553,845 B1 | 1/2017 | Talmor et al. |
| 9,571,502 B2 | 2/2017 | Basso et al. |
| 9,571,523 B2 | 2/2017 | Porras et al. |
| 9,594,640 B1 | 3/2017 | Chheda |
| 9,596,141 B2 | 3/2017 | McDowall |
| 9,641,249 B2 | 5/2017 | Kaneriya et al. |
| 9,654,300 B2 | 5/2017 | Pani |
| 9,654,361 B2 | 5/2017 | Vasseur et al. |
| 9,654,409 B2 | 5/2017 | Yadav et al. |
| 9,660,886 B1 | 5/2017 | Ye et al. |
| 9,660,897 B1 | 5/2017 | Gredler |
| 9,667,645 B1 | 5/2017 | Belani et al. |
| 9,680,875 B2 | 6/2017 | Knjazihhin et al. |
| 9,686,180 B2 | 6/2017 | Chu et al. |
| 9,686,296 B1 | 6/2017 | Murchison et al. |
| 9,690,644 B2 | 6/2017 | Anderson et al. |
| 9,781,004 B2 | 10/2017 | Danait et al. |
| 9,787,559 B1 | 10/2017 | Schroeder |
| 9,998,247 B1 | 6/2018 | Choudhury et al. |
| 10,084,795 B2 | 9/2018 | Akireddy et al. |
| 10,084,833 B2 | 9/2018 | McDonnell et al. |
| 10,084,895 B2 | 9/2018 | Kasat et al. |
| 2002/0143855 A1 | 10/2002 | Traversat et al. |
| 2002/0178246 A1 | 11/2002 | Mayer |
| 2003/0229693 A1 | 12/2003 | Mahlik et al. |
| 2004/0073647 A1 | 4/2004 | Gentile et al. |
| 2004/0168100 A1 | 8/2004 | Thottan et al. |
| 2004/0177247 A1 * | 9/2004 | Peles ............... H04L 63/08 713/155 |
| 2005/0108389 A1 | 5/2005 | Kempin et al. |
| 2007/0011629 A1 | 1/2007 | Shacham et al. |
| 2007/0124437 A1 | 5/2007 | Chervets |
| 2007/0214244 A1 | 9/2007 | Hitokoto et al. |
| 2008/0031147 A1 | 2/2008 | Fieremans et al. |
| 2008/0117827 A1 | 5/2008 | Matsumoto et al. |
| 2008/0133731 A1 | 6/2008 | Bradley et al. |
| 2008/0172716 A1 | 7/2008 | Talpade et al. |
| 2009/0240758 A1 | 9/2009 | Pasko et al. |
| 2009/0249284 A1 | 10/2009 | Antosz et al. |
| 2010/0191612 A1 | 7/2010 | Raleigh |
| 2010/0198909 A1 | 8/2010 | Kosbab et al. |
| 2011/0093612 A1 | 4/2011 | Murakami |
| 2011/0295983 A1 | 12/2011 | Medved et al. |
| 2012/0054163 A1 | 3/2012 | Liu et al. |
| 2012/0198073 A1 | 8/2012 | Srikanth et al. |
| 2012/0297061 A1 | 11/2012 | Pedigo et al. |
| 2013/0097660 A1 | 4/2013 | Das et al. |
| 2013/0191516 A1 | 7/2013 | Sears |
| 2014/0019597 A1 | 1/2014 | Nath et al. |
| 2014/0177638 A1 | 6/2014 | Bragg et al. |
| 2014/0222996 A1 | 8/2014 | Vasseur et al. |
| 2014/0304831 A1 | 10/2014 | Hidlreth et al. |
| 2014/0307556 A1 | 10/2014 | Zhang |
| 2014/0321277 A1 | 10/2014 | Lynn, Jr. et al. |
| 2014/0379915 A1 | 12/2014 | Yang et al. |
| 2015/0019756 A1 | 1/2015 | Masuda |
| 2015/0067764 A1 * | 3/2015 | Kim ............... H04L 63/0227 726/1 |
| 2015/0113143 A1 | 4/2015 | Stuart et al. |
| 2015/0124826 A1 | 5/2015 | Edsall et al. |
| 2015/0186206 A1 | 7/2015 | Bhattacharya et al. |
| 2015/0234695 A1 | 8/2015 | Cuthbert et al. |
| 2015/0244617 A1 | 8/2015 | Nakil et al. |
| 2015/0271104 A1 | 9/2015 | Chikkamath et al. |
| 2015/0271178 A1 * | 9/2015 | Bhattacharya ......... G06F 16/33 726/1 |
| 2015/0295771 A1 | 10/2015 | Cuni et al. |
| 2015/0365314 A1 | 12/2015 | Hiscock et al. |
| 2015/0381484 A1 | 12/2015 | Hira et al. |
| 2016/0020993 A1 | 1/2016 | Wu et al. |
| 2016/0021141 A1 | 1/2016 | Liu et al. |
| 2016/0026631 A1 | 1/2016 | Salam et al. |
| 2016/0036636 A1 | 2/2016 | Erickson et al. |
| 2016/0048420 A1 | 2/2016 | Gourlay et al. |
| 2016/0078220 A1 | 3/2016 | Scharf et al. |
| 2016/0080350 A1 | 3/2016 | Chaturvedi et al. |
| 2016/0099883 A1 | 4/2016 | Voit et al. |
| 2016/0105317 A1 | 4/2016 | Zimmermann et al. |
| 2016/0112246 A1 | 4/2016 | Singh et al. |
| 2016/0112269 A1 | 4/2016 | Singh et al. |
| 2016/0142432 A1 * | 5/2016 | Manadhata ......... H04L 63/101 726/25 |
| 2016/0149751 A1 | 5/2016 | Pani et al. |
| 2016/0164748 A1 | 6/2016 | Kim |
| 2016/0224277 A1 | 8/2016 | Batra et al. |
| 2016/0241436 A1 | 8/2016 | Fourie et al. |
| 2016/0254964 A1 | 9/2016 | Benc |
| 2016/0267384 A1 | 9/2016 | Salam et al. |
| 2016/0323319 A1 | 11/2016 | Gourlay et al. |
| 2016/0330076 A1 | 11/2016 | Tiwari et al. |
| 2016/0352566 A1 | 12/2016 | Mekkattuparamnban et al. |
| 2016/0380892 A1 | 12/2016 | Mahadevan et al. |
| 2017/0026292 A1 | 1/2017 | Smith et al. |
| 2017/0031800 A1 | 2/2017 | Shani et al. |
| 2017/0031970 A1 | 2/2017 | Burk |
| 2017/0048110 A1 | 2/2017 | Wu et al. |

(56) References Cited

U.S. PATENT DOCUMENTS

| | | |
|---|---|---|
| 2017/0048126 A1 | 2/2017 | Handige Shankar et al. |
| 2017/0054758 A1 | 2/2017 | Maino et al. |
| 2017/0063599 A1 | 3/2017 | Wu et al. |
| 2017/0093630 A1 | 3/2017 | Foulkes |
| 2017/0093664 A1 | 3/2017 | Lynam et al. |
| 2017/0093750 A1 | 3/2017 | McBride et al. |
| 2017/0093918 A1 | 3/2017 | Banerjee et al. |
| 2017/0111259 A1 | 4/2017 | Wen et al. |
| 2017/0111362 A1* | 4/2017 | Xie .................. H04L 67/06 |
| 2017/0118167 A1 | 4/2017 | Subramanya et al. |
| 2017/0126740 A1 | 5/2017 | Bejarano Ardila et al. |
| 2017/0126792 A1 | 5/2017 | Halpern et al. |
| 2017/0134233 A1 | 5/2017 | Dong et al. |
| 2017/0163442 A1 | 6/2017 | Shen et al. |
| 2017/0187577 A1 | 6/2017 | Nevrekar et al. |
| 2017/0195187 A1 | 7/2017 | Bennett et al. |
| 2017/0206129 A1 | 7/2017 | Yankilevich et al. |
| 2017/0222873 A1 | 8/2017 | Lee et al. |
| 2018/0063146 A1* | 3/2018 | Nakata .................. G06F 21/56 |
| 2018/0069754 A1 | 3/2018 | Dasu et al. |
| 2018/0167294 A1 | 6/2018 | Gupta et al. |
| 2018/0183798 A1* | 6/2018 | Wang .................. H04L 63/101 |

FOREIGN PATENT DOCUMENTS

| | | |
|---|---|---|
| CN | 105721297 | 6/2016 |
| CN | 106130766 | 11/2016 |
| CN | 106603264 | 4/2017 |
| CN | 103701926 | 6/2017 |
| WO | WO 2015/014177 | 2/2015 |
| WO | WO 2015/187337 | 12/2015 |
| WO | WO 2016/011888 | 1/2016 |
| WO | WO 2016/039730 | 3/2016 |
| WO | WO 2016/072996 | 5/2016 |
| WO | WO 2016/085516 | 6/2016 |
| WO | WO 2016/093861 | 6/2016 |
| WO | WO 2016/119436 | 8/2016 |
| WO | WO 2016/130108 | 8/2016 |
| WO | WO 2016/161127 | 10/2016 |
| WO | WO 2017/031922 | 3/2017 |
| WO | WO 2017/039606 | 3/2017 |
| WO | WO 2017/105452 | 6/2017 |

OTHER PUBLICATIONS

Cisco Systems, Inc., "Cisco Application Centric Infrastructure 9ACI Endpoint Groups (EPG) Usange and Design," White Paper, May 2014, pp. 1-14.

Cisco Systems, Inc., "The Cisco Application Policy Infrastructure Controller Introduction: What is the Cisco Application Policy Infrastructure Controller?" Jul. 31, 2014, 19 pages.

Jain, Praveen, et al., "In-Line Distributed and Stateful Security Policies for Applications in a Network Environment," Cisco Systems, Inc., Aug. 16, 2016, 13 pages.

Maldonado-Lopez, Ferney, et al., "Detection and prevention of firewall—rule conflicts on software-defined networking," 2015 7th International Workshop on Reliable Networks Design and Modeling (RNDM), IEEE, Oct. 5, 2015, pp. 259-265.

Vega, Andres, et al., "Troubleshooting Cisco Application Centric Infrastructure: Analytical problem solving applied to the Policy Driven Data Center," Feb. 15, 2016, 84 pages.

Xia, Wenfeng, et al., "A Survey on Software-Defined Networking," IEEE Communications Surveys and Tutorials, Mar. 16, 2015, pp. 27-51.

Akella, Aditya, et al., "A Highly Available Software Defined Fabric," HotNets-XIII, Oct. 27-28, 2014, Los Angeles, CA, USA, Copyright 2014, ACM, pp. 1-7.

Alsheikh, Mohammad Abu, et al., "Machine Learning in Wireless Sensor Networks: Algorithms, Strategies, and Application," Mar. 19, 2015, pp. 1-23.

Author Unknown, "Aids to Pro-active Management of Distributed Resources through Dynamic Fault-Localization and Availability Prognosis," FaultLocalization-TR01-CADlab, May 2006, pp. 1-9.

Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.

Cisco, "Verify Contracts and Rules in the ACI Fabric," Cisco, Updated Aug. 19, 2016, Document ID: 119023, pp. 1-20.

De Silva et al., "Network-wide Security Analysis," Semantic Scholar, Oct. 25, 2011, pp. 1-11.

Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.

Fayaz, Seyed K., et al., "Efficient Network Reachability Analysis using a Succinct Control Plane Representation," 2016, ratul.org, pp. 1-16.

Feldmann, Anja, et al., "IP Network Configuration for Intradomain Traffic Engineering," Semantic Scholar, accessed on Jul. 20, 2017, pp. 1-27.

Han, Yoonseon, et al., "An Intent-based Network Virtualization Platform for SDN," 2016 I FIP, pp. 1-6.

Han, Wonkyu, et al., "LPM: Layered Policy Management for Software-Defined Networks," Mar. 8, 2016, pp. 1-8.

Kazemian, Peyman, et al., "Real Time Network Policy Checking using Header Space Analysis," USENIX Association, 10th USENIX Symposium on Networked Systems Design and Implementation (NSDI '13) pp. 99-111, 2013.

Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.

Le, Franck, et al., "Minerals: Using Data Mining to Detect Router Misconfigurations," CyLab, Carnegie Mellon University, CMU-CyLab-06-008, May 23, 2006, pp. 1-14.

Liang, Chieh-Jan Mike, et al., "SIFT: Building an Internet of Safe Things," Microsoft, IPSN' 15, Apr. 14-16, 2015, Seattle, WA, ACM 978, pp. 1-12.

Lindem, A., et al., "Network Device Yang Organizational Model draft-rtgyangdt-rtgwg-device-model-01," Network Working Group, Internet-draft, Sep. 21, 2015, pp. 1-33.

Liu, Jason, et al., "A Real-Time Network Simulation Infrastructure Based on Open VPN," Journal of Systems and Software, Aug. 4, 2008, pp. 1-45.

Lopes, Nuno P., et al., "Automatically verifying reachability and well-formedness in P4 Networks," Microsoft, accessed on Jul. 18, 2017, pp. 1-13.

Mai, Haohui, et al., "Debugging the Data Plane with Anteater," SIGCOMM11, Aug. 15-19, 2011, pp. 1-12.

Miller, Nancy, et al., "Collecting Network Status Information for Network-Aware Applications," INFOCOM 2000, pp. 1-10.

Miranda, Joao Sales Henriques, "Fault Isolation in Software Defined Networks," www.gsd.inescid.pt, pp. 1-10.

Moon, Daekyeong, et al., "Bridging the Software/Hardware Forwarding Divide," Berkeley.edu, Dec. 18, 2010, pp. 1-15

Panda, Aurojit, et al., "SCL: Simplifying Distributed SDN Control Planes," people.eecs.berkeley.edu, Mar. 2017, pp. 1-17.

Shin, Seugwon, et al., "FRESCO: Modular Composable Security Services for Software-Defined Networks," To appear in the ISOC Network and Distributed System Security Symposium, Feb. 2013, pp. 1-16.

Shukla, Apoorv, et al., "Towards meticulous data plane monitoring," kaust.edu.sa, access on Aug. 1, 2017, pp. 1-2.

Tang, Yongning, et al., "Automatic belief network modeling via policy inference for SDN fault localization," Journal of Internet Services and Applications, 2016, pp. 1-13.

Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.

Tongaonkar, Alok, et al., "Inferring Higher Level Policies from Firewall Rules," Proceedings of the 21st Large Installation System Administration Conference (LISA '07), Nov. 11-16, 2007, pp. 1-14.

(56) References Cited

OTHER PUBLICATIONS

Yu et al., "A Flexible Framework for Wireless-Based Intelligent Sensor with Reconfigurability, Dynamic adding, and Web interface," Conference Paper, Jul. 24, 2006, IEEE 2006, pp. 1-7.
Zhou, Shijie, et al., "High-Performance Packet Classification on GPU," 2014 IEEE, pp. 1-6.

* cited by examiner

SYSTEM AND METHOD FOR MIGRATING TO AND MAINTAINING A WHITE-LIST NETWORK SECURITY MODEL

RELATED APPLICATIONS

This application claims the benefit of U.S. Application No. 62/520,862, filed Jun. 16, 2017, entitled "SYSTEM AND METHOD FOR MIGRATING TO AND MAINTAINING A WHITE-LIST NETWORK SECURITY MODEL", which is incorporated by reference in its entirety.

TECHNICAL FIELD

The present technology pertains to network configuration and troubleshooting, and more specifically to white-list network security models.

BACKGROUND

Network configurations for large data center networks are often specified at a centralized controller. The controller can program switches, routers, servers, and elements in the network according to the specified network configurations. Network configurations are inherently very complex, and involve low level as well as high level configurations of several layers of the network such as access policies, forwarding policies, routing policies, security policies, QoS policies, etc. Given such complexity, the network configuration process is error prone. In many cases, the configurations defined on a controller, which can reflect an intent specification for the network, can contain errors and inconsistencies that are often extremely difficult to identify and may create significant problems in the network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
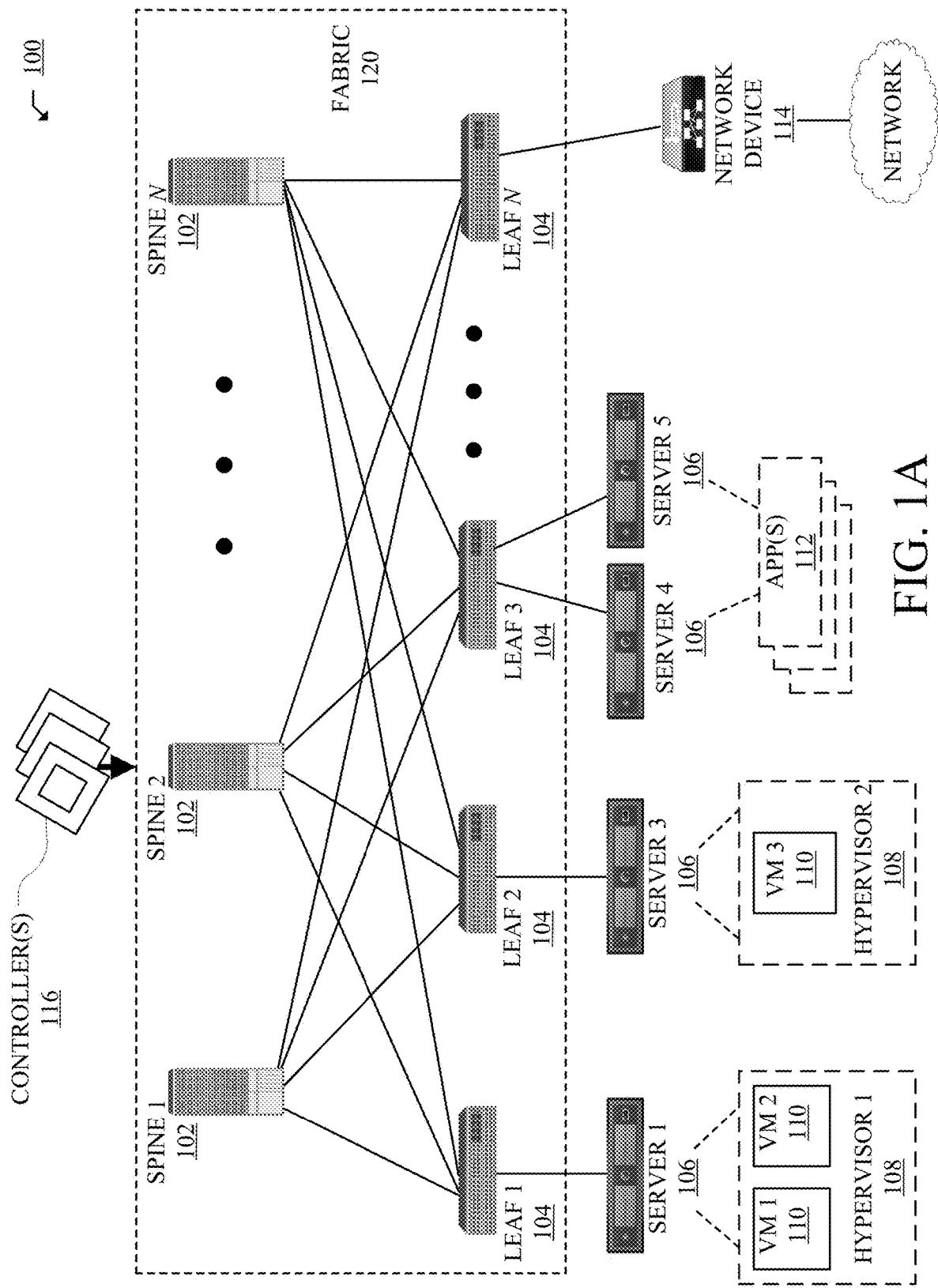
FIGS. 1A and 1B illustrate example network environments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for migrating and maintaining white-list security models. The systems, methods, and computer-readable media include identifying first network traffic associated with at least one entry recorded in a permit-all access log, the permit-all access log recording access of all network traffic entering a network. The systems, methods, and computer-readable media further include determining, using the at least one processing device, the first network traffic should be forwarded in the network based on a white-list security model and when the first network traffic should be forwarded in the network based on a white-list security model, generating a permit-access policy for the first network traffic. The systems, methods, and computer readable media include implementing, using the at least one processing device, the permit-access policy generated for the first network traffic into the network.

Description

Figure 1B:
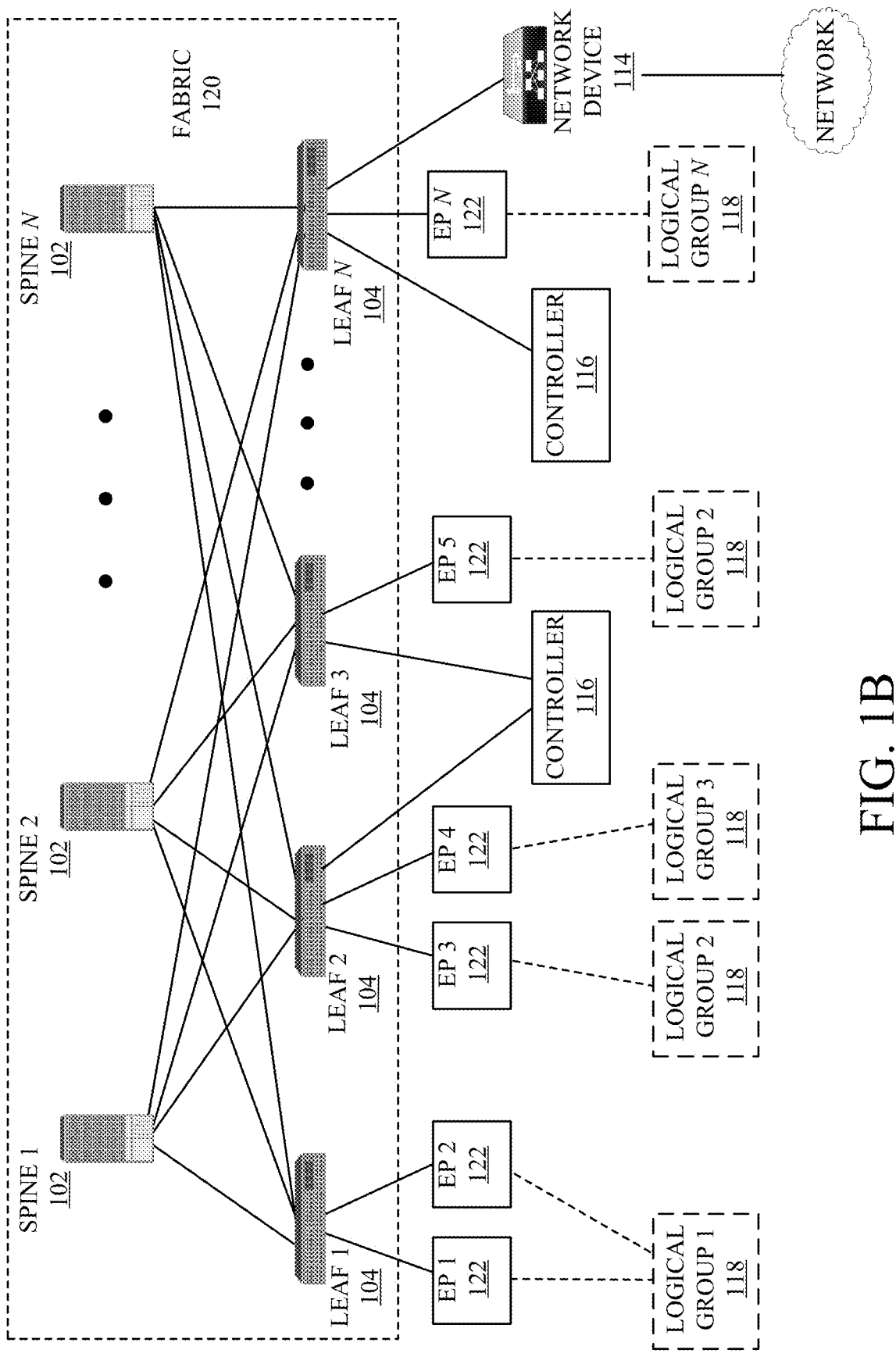
Figure 6:
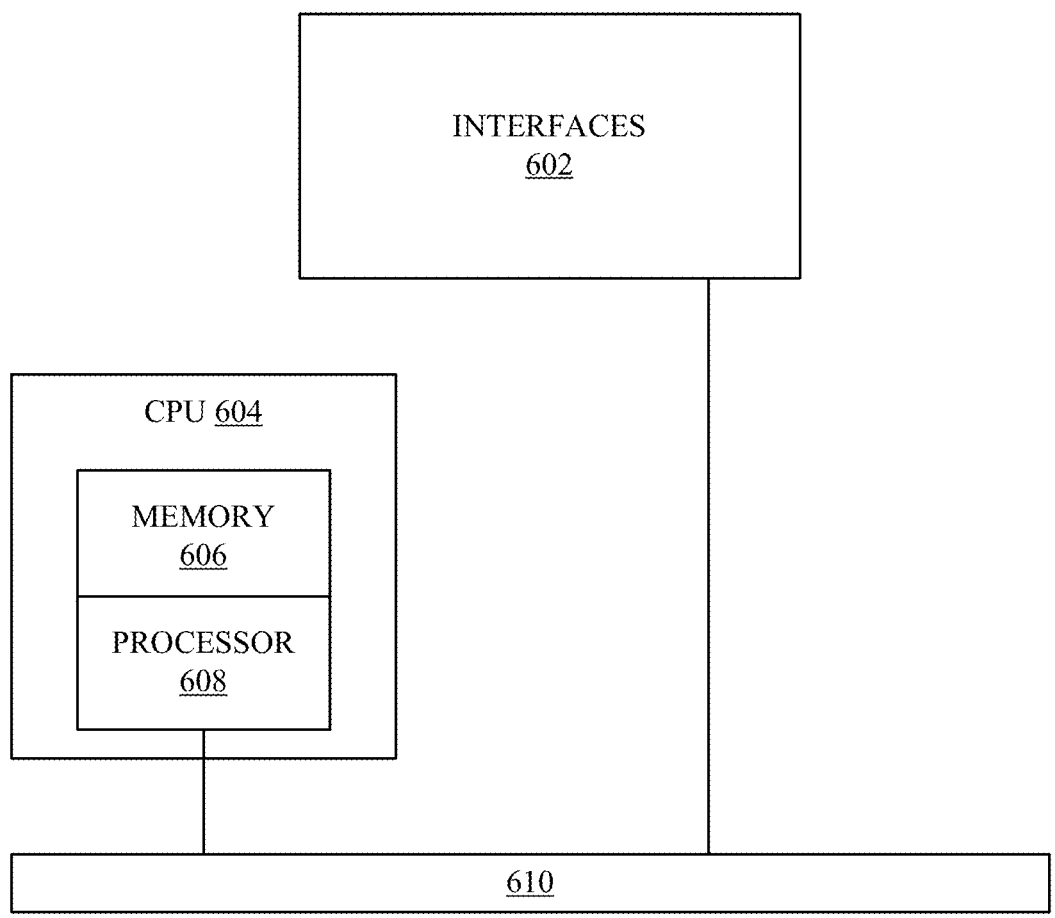
FIG. 6 illustrates an example network device in accordance with various embodiments.
Figure 7:
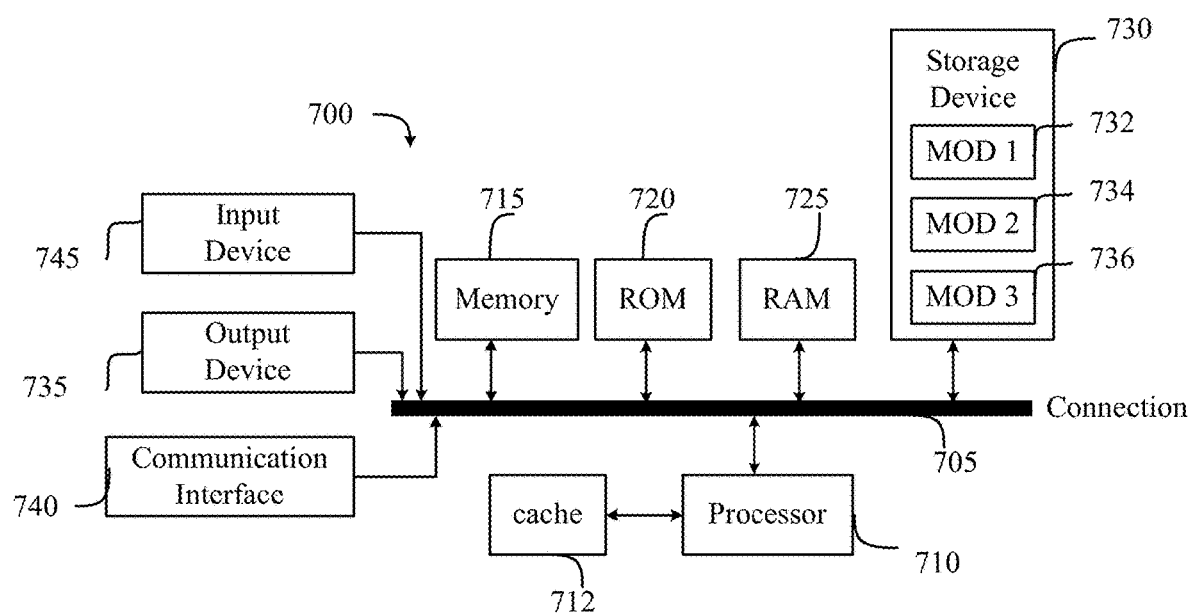
FIG. 7 illustrates an example computing device in accordance with various embodiments.

The disclosed technology addresses the need in the art for migrating and maintaining white-list security models within a network. The present technology will be described in the following disclosure as follows. The discussion begins with an introductory discussion of network assurance and a description of example computing environments, as illustrated in FIGS. 1A and 1B. A discussion of network models for network assurance, as shown in FIGS. 2A through 2D, and network assurance systems and methods, as shown in FIGS. 3A-C, 4, 5, 6, and 7 will then follow. The discussion concludes with a description of an example network device, as illustrated in FIG. 6, and an example computing device, as illustrated in FIG. 7, including example hardware components suitable for hosting software applications and performing computing operations. The disclosure now turns to an introductory discussion of network assurance.

Network assurance is the guarantee or determination that the network is behaving as intended by the network operator and has been configured properly (e.g., the network is doing what it is intended to do). Intent can encompass various network operations, such as bridging, routing, security, service chaining, endpoints, compliance, QoS (Quality of Service), audits, etc. Intent can be embodied in one or more policies, settings, configurations, etc., defined for the network and individual network elements (e.g., switches, routers, applications, resources, etc.). However, often times, the configurations, policies, etc., defined by a network operator are incorrect or not accurately reflected in the actual behavior of the network. For example, a network operator specifies a configuration A for one or more types of traffic but later finds out that the network is actually applying configuration B to that traffic or otherwise processing that traffic in a manner that is inconsistent with configuration A. This can be a result of many different causes, such as hardware errors, software bugs, varying priorities, configuration conflicts, misconfiguration of one or more settings, improper rule rendering by devices, unexpected errors or events, software upgrades, configuration changes, failures, etc. As another example, a network operator implements configuration C but one or more other configurations result in the network behaving in a manner that is inconsistent with the intent reflected by the implementation of configuration C. For example, such a situation can result when configuration C conflicts with other configurations in the network.

The approaches herein can provide network assurance by modeling various aspects of the network and/or performing consistency checks as well as other network assurance checks. The network assurance approaches herein can be implemented in various types of networks, including a private network, such as a local area network (LAN); an enterprise network; a standalone or traditional network, such as a data center network; a network including a physical or underlay layer and a logical or overlay layer, such as a VXLAN or software-defined network (SDN) (e.g., Application Centric Infrastructure (ACI) or VMware NSX networks); etc.

Network models can be constructed for a network and implemented for network assurance. A network model can provide a representation of one or more aspects of a network, including, without limitation the network's policies, configurations, requirements, security, routing, topology, applications, hardware, filters, contracts, access control lists, infrastructure, etc. As will be further explained below, different types of models can be generated for a network.

Such models can be implemented to ensure that the behavior of the network will be consistent (or is consistent) with the intended behavior reflected through specific configurations (e.g., policies, settings, definitions, etc.) implemented by the network operator. Unlike traditional network monitoring, which involves sending and analyzing data packets and observing network behavior, network assurance can be performed through modeling without necessarily ingesting packet data or monitoring traffic or network behavior. This can result in foresight, insight, and hindsight: problems can be prevented before they occur, identified when they occur, and fixed immediately after they occur.

Thus, network assurance can involve modeling properties of the network to deterministically predict the behavior of the network. The network can be determined to be healthy if the model(s) indicate proper behavior (e.g., no inconsistencies, conflicts, errors, etc.). The network can be determined to be functional, but not fully healthy, if the modeling indicates proper behavior but some inconsistencies. The network can be determined to be non-functional and not healthy if the modeling indicates improper behavior and errors. If inconsistencies or errors are detected by the modeling, a detailed analysis of the corresponding model(s) can allow one or more underlying or root problems to be identified with great accuracy.

The modeling can consume numerous types of smart events which model a large amount of behavioral aspects of the network. Smart events can impact various aspects of the network, such as underlay services, overlay services, tenant connectivity, tenant security, tenant endpoint (EP) mobility, tenant policy, tenant routing, resources, etc.

Having described various aspects of network assurance, the disclosure now turns to a discussion of example network environments for network assurance.

FIG. 1A illustrates a diagram of an example Network Environment 100, such as a data center. The Network Environment 100 can include a Fabric 120 which can represent the physical layer or infrastructure (e.g., underlay)

of the Network Environment 100. Fabric 120 can include Spines 102 (e.g., spine routers or switches) and Leafs 104 (e.g., leaf routers or switches) which can be interconnected for routing or switching traffic in the Fabric 120. Spines 102 can interconnect Leafs 104 in the Fabric 120, and Leafs 104 can connect the Fabric 120 to an overlay or logical portion of the Network Environment 100, which can include application services, servers, virtual machines, containers, endpoints, etc. Thus, network connectivity in the Fabric 120 can flow from Spines 102 to Leafs 104, and vice versa. The interconnections between Leafs 104 and Spines 102 can be redundant (e.g., multiple interconnections) to avoid a failure in routing. In some embodiments, Leafs 104 and Spines 102 can be fully connected, such that any given Leaf is connected to each of the Spines 102, and any given Spine is connected to each of the Leafs 104. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies or rules. Network policies and rules can be driven by one or more Controllers 116, and/or implemented or enforced by one or more devices, such as Leafs 104. Leafs 104 can connect other elements to the Fabric 120. For example, Leafs 104 can connect Servers 106, Hypervisors 108, Virtual Machines (VMs) 110, Applications 112, Network Device 114, etc., with Fabric 120. Such elements can reside in one or more logical or virtual layers or networks, such as an overlay network. In some cases, Leafs 104 can encapsulate and decapsulate packets to and from such elements (e.g., Servers 106) in order to enable communications throughout Network Environment 100 and Fabric 120. Leafs 104 can also provide any other devices, services, tenants, or workloads with access to Fabric 120. In some cases, Servers 106 connected to Leafs 104 can similarly encapsulate and decapsulate packets to and from Leafs 104. For example, Servers 106 can include one or more virtual switches or routers or tunnel endpoints for tunneling packets between an overlay or logical layer hosted by, or connected to, Servers 106 and an underlay layer represented by Fabric 120 and accessed via Leafs 104.

Applications 112 can include software applications, services, containers, appliances, functions, service chains, etc. For example, Applications 112 can include a firewall, a database, a CDN server, an IDS/IPS, a deep packet inspection service, a message router, a virtual switch, etc. An application from Applications 112 can be distributed, chained, or hosted by multiple endpoints (e.g., Servers 106, VMs 110, etc.), or may run or execute entirely from a single endpoint.

VMs 110 can be virtual machines hosted by Hypervisors 108 or virtual machine managers running on Servers 106. VMs 110 can include workloads running on a guest operating system on a respective server. Hypervisors 108 can provide a layer of software, firmware, and/or hardware that creates, manages, and/or runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can host one or more VMs 110.

In some cases, VMs 110 and/or Hypervisors 108 can be migrated to other Servers 106. Servers 106 can similarly be migrated to other locations in Network Environment 100. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 106, Hypervisors 108, and/or VMs 110 can represent or reside in a tenant or customer space. Tenant space can include workloads, services, applications, devices, networks, and/or resources that are associated with one or more clients or subscribers. Accordingly, traffic in Network Environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 116, Servers 106, Leafs 104, etc.

Configurations in Network Environment 100 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 116, which can implement or propagate such configurations through Network Environment 100. In some examples, Controllers 116 can be Application Policy Infrastructure Controllers (APICs) in an ACI framework. In other examples, Controllers 116 can be one or more management components for associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 100, such as Leafs 104, Servers 106, Hypervisors 108, Controllers 116, etc. As previously explained, Network Environment 100 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 100. Endpoints can have one or more attributes such as a VM name, guest OS name, a security tag, application profile, etc. Application configurations can be applied between EPGs, instead of endpoints directly, in the form of contracts. Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more Controllers 116. Leaf 104 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 1A, Network Environment 100 can deploy different hosts via Leafs 104, Servers 106, Hypervisors 108, VMs 110, Applications 112, and Controllers 116, such as VMWARE ESXi hosts, WINDOWS HYPER-V hosts, bare metal physical hosts, etc. Network Environment 100 may interoperate with a variety of Hypervisors 108, Servers 106 (e.g., physical and/or virtual servers), SDN orchestration platforms, etc. Network Environment 100 may implement a declarative model to allow its integration with application design and holistic network policy.

Controllers 116 can provide centralized access to fabric information, application configuration, resource configuration, application-level configuration modeling for a software-defined network (SDN) infrastructure, integration with management systems or servers, etc. Controllers 116 can form a control plane that interfaces with an application plane via northbound APIs and a data plane via southbound APIs.

As previously noted, Controllers 116 can define and manage application-level model(s) for configurations in Network Environment 100. In some cases, application or device configurations can also be managed and/or defined by other components in the network. For example, a hypervisor or virtual appliance, such as a VM or container, can run a server or management tool to manage software and services in Network Environment 100, including configurations and settings for virtual appliances.

As illustrated above, Network Environment 100 can include one or more different types of SDN solutions, hosts, etc. For the sake of clarity and explanation purposes, various examples in the disclosure will be described with reference to an ACI framework, and Controllers 116 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 106 (e.g., physical or logical), Hypervisors 108, VMs 110, containers (e.g., Applications 112), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

FIG. 1B illustrates another example of Network Environment 100. In this example, Network Environment 100 includes Endpoints 122 connected to Leafs 104 in Fabric 120. Endpoints 122 can be physical and/or logical or virtual entities, such as servers, clients, VMs, hypervisors, software containers, applications, resources, network devices, workloads, etc. For example, an Endpoint 122 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 122 can be associated with respective Logical Groups 118. Logical Groups 118 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 118 are EPGs in an ACI environment and/or other logical groups (e.g., SGs) in another SDN environment.

Traffic to and/or from Endpoints 122 can be classified, processed, managed, etc., based Logical Groups 118. For example, Logical Groups 118 can be used to classify traffic to or from Endpoints 122, apply policies to traffic to or from Endpoints 122, define relationships between Endpoints 122, define roles of Endpoints 122 (e.g., whether an endpoint consumes or provides a service, etc.), apply rules to traffic to or from Endpoints 122, apply filters or access control lists (ACLs) to traffic to or from Endpoints 122, define communication paths for traffic to or from Endpoints 122, enforce requirements associated with Endpoints 122, implement security and other configurations associated with Endpoints 122, etc.

In an ACI environment, Logical Groups 118 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Figure 2A:
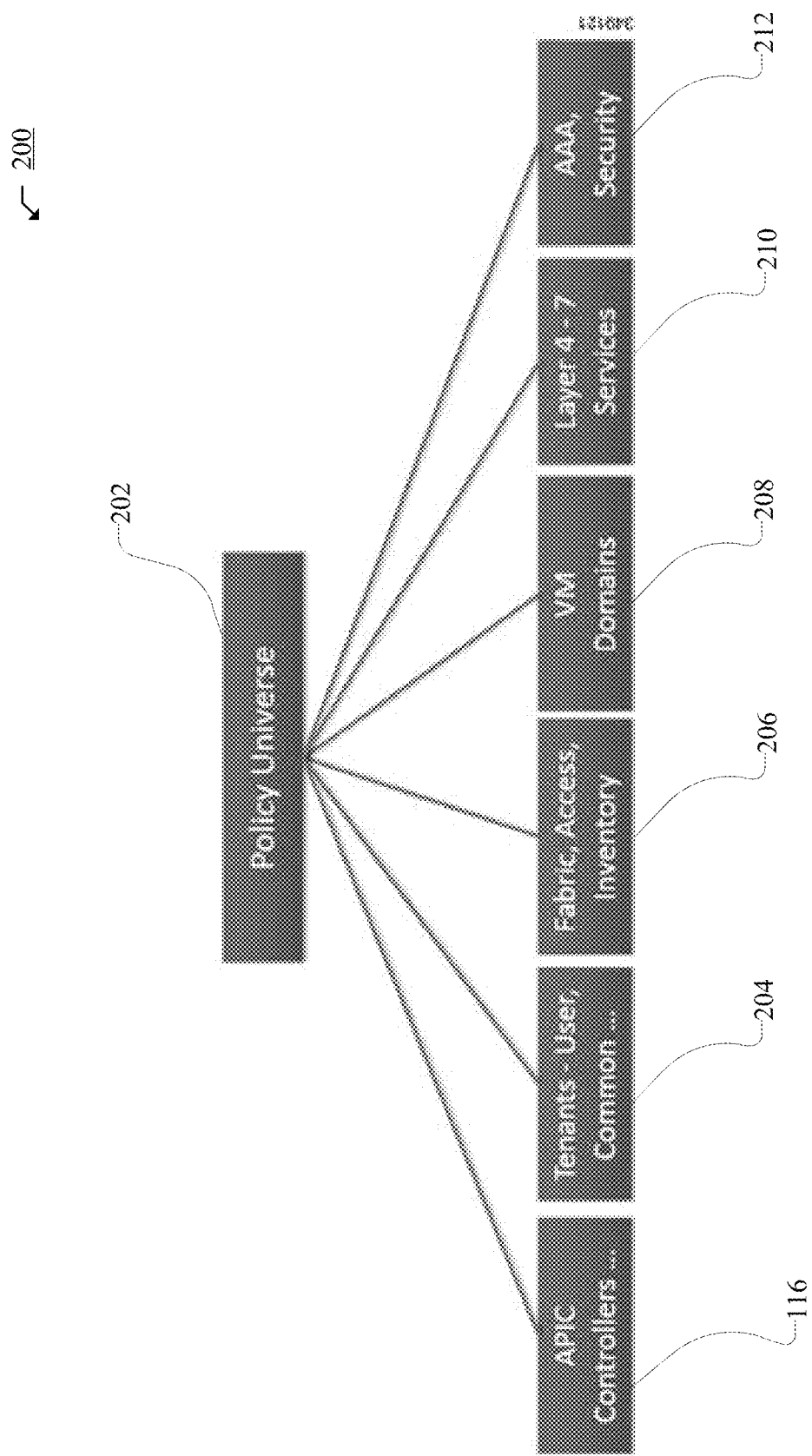
FIG. 2A illustrates an example object model for a network.

FIG. 2A illustrates a diagram of an example Management Information Model 200 for an SDN network, such as Network Environment 100. The following discussion of Management Information Model 200 references various terms which shall also be used throughout the disclosure. Accordingly, for clarity, the disclosure shall first provide below a list of terminology, which will be followed by a more detailed discussion of Management Information Model 200.

As used herein, an "Alias" can refer to a changeable name for a given object. Thus, even if the name of an object, once created, cannot be changed, the Alias can be a field that can be changed.

As used herein, the term "Aliasing" can refer to a rule (e.g., contracts, policies, configurations, etc.) that overlaps one or more other rules. For example, Contract 1 defined in a logical model of a network can be said to be aliasing Contract 2 defined in the logical model of the network if Contract 1 overlaps Contract 1. In this example, by aliasing Contract 2, Contract 1 may render Contract 2 redundant or inoperable. For example, if Contract 1 has a higher priority than Contract 2, such aliasing can render Contract 2 redundant based on Contract 1's overlapping and higher priority characteristics.

As used herein, the term "APIC" can refer to one or more controllers (e.g., Controllers 116) in an ACI framework. The APIC can provide a unified point of automation and management, policy programming, application deployment, health monitoring for an ACI multitenant fabric. The APIC can be implemented as a single controller, a distributed controller, or a replicated, synchronized, and/or clustered controller.

As used herein, the term "BDD" can refer to a binary decision tree. A binary decision tree can be a data structure representing functions, such as Boolean functions.

As used herein, the term "BD" can refer to a bridge domain. A bridge domain can be a set of logical ports that share the same flooding or broadcast characteristics. Like a virtual LAN (VLAN), bridge domains can span multiple devices. A bridge domain can be a L2 (Layer 2) construct.

As used herein, a "Consumer" can refer to an endpoint, resource, and/or EPG that consumes a service.

As used herein, a "Context" can refer to an L3 (Layer 3) address domain that allows multiple instances of a routing table to exist and work simultaneously. This increases functionality by allowing network paths to be segmented without using multiple devices. Non-limiting examples of a context or L3 address domain can include a Virtual Routing and Forwarding (VRF) instance, a private network, and so forth.

As used herein, the term "Contract" can refer to rules or configurations that specify what and how communications in a network are conducted (e.g., allowed, denied, filtered, processed, etc.). In an ACI network, contracts can specify how communications between endpoints and/or EPGs take place. In some examples, a contract can provide rules and configurations akin to an Access Control List (ACL).

As used herein, the term "Distinguished Name" (DN) can refer to a unique name that describes an object, such as an MO, and locates its place in Management Information Model 200. In some cases, the DN can be (or equate to) a Fully Qualified Domain Name (FQDN).

As used herein, the term "Endpoint Group" (EPG) can refer to a logical entity or object associated with a collection or group of endpoints as previously described with reference to FIG. 1B.

As used herein, the term "Filter" can refer to a parameter or configuration for allowing communications. For example, in a whitelist model where all communications are blocked by default, a communication must be given explicit permission to prevent such communication from being blocked. A filter can define permission(s) for one or more communications or packets. A filter can thus function similar to an ACL or Firewall rule. In some examples, a filter can be implemented in a packet (e.g., TCP/IP) header field, such as L3 protocol type, L4 (Layer 4) ports, and so on, which is used to allow inbound or outbound communications between endpoints or EPGs, for example.

As used herein, the term "L2 Out" can refer to a bridged connection. A bridged connection can connect two or more segments of the same network so that they can communicate. In an ACI framework, an L2 out can be a bridged (Layer 2) connection between an ACI fabric (e.g., Fabric 120) and an outside Layer 2 network, such as a switch.

As used herein, the term "L3 Out" can refer to a routed connection. A routed Layer 3 connection uses a set of protocols that determine the path that data follows in order to travel across networks from its source to its destination. Routed connections can perform forwarding (e.g., IP forwarding) according to a protocol selected, such as BGP (border gateway protocol), OSPF (Open Shortest Path First), EIGRP (Enhanced Interior Gateway Routing Protocol), etc.

As used herein, the term "Managed Object" (MO) can refer to an abstract representation of objects that are managed in a network (e.g., Network Environment 100). The objects can be concrete objects (e.g., a switch, server, adapter, etc.), or logical objects (e.g., an application profile, an EPG, a fault, etc.). The MOs can be network resources or elements that are managed in the network. For example, in an ACI environment, an MO can include an abstraction of an ACI fabric (e.g., Fabric 120) resource.

As used herein, the term "Management Information Tree" (MIT) can refer to a hierarchical management information tree containing the MOs of a system. For example, in ACI, the MIT contains the MOs of the ACI fabric (e.g., Fabric 120). The MIT can also be referred to as a Management Information Model (MIM), such as Management Information Model 200.

As used herein, the term "Policy" can refer to one or more specifications for controlling some aspect of system or network behavior. For example, a policy can include a named entity that contains specifications for controlling some aspect of system behavior. To illustrate, a Layer 3 Outside Network Policy can contain the BGP protocol to enable BGP routing functions when connecting Fabric 120 to an outside Layer 3 network.

As used herein, the term "Profile" can refer to the configuration details associated with a policy. For example, a profile can include a named entity that contains the configuration details for implementing one or more instances of a policy. To illustrate, a switch node profile for a routing policy can contain the switch-specific configuration details to implement the BGP routing protocol.

As used herein, the term "Provider" refers to an object or entity providing a service. For example, a provider can be an EPG that provides a service.

As used herein, the term "Subject" refers to one or more parameters in a contract for defining communications. For example, in ACI, subjects in a contract can specify what information can be communicated and how. Subjects can function similar to ACLs.

As used herein, the term "Tenant" refers to a unit of isolation in a network. For example, a tenant can be a secure and exclusive virtual computing environment. In ACI, a tenant can be a unit of isolation from a policy perspective, but does not necessarily represent a private network. Indeed, ACI tenants can contain multiple private networks (e.g., VRFs). Tenants can represent a customer in a service provider setting, an organization or domain in an enterprise setting, or just a grouping of policies.

As used herein, the term "VRF" refers to a virtual routing and forwarding instance. The VRF can define a Layer 3 address domain that allows multiple instances of a routing table to exist and work simultaneously. This increases functionality by allowing network paths to be segmented without using multiple devices. Also known as a context or private network.

Having described various terms used herein, the disclosure now returns to a discussion of Management Information Model (MIM) 200 in FIG. 2A. As previously noted, MIM 200 can be a hierarchical management information tree or MIT. Moreover, MIM 200 can be managed and processed by Controllers 116, such as APICs in an ACI. Controllers 116 can enable the control of managed resources by presenting their manageable characteristics as object properties that can be inherited according to the location of the object within the hierarchical structure of the model.

The hierarchical structure of MIM 200 starts with Policy Universe 202 at the top (Root) and contains parent and child nodes 116, 204, 206, 208, 210, 212. Nodes 116, 202, 204, 206, 208, 210, 212 in the tree represent the managed objects (MOs) or groups of objects. Each object in the fabric (e.g., Fabric 120) has a unique distinguished name (DN) that describes the object and locates its place in the tree. The Nodes 116, 202, 204, 206, 208, 210, 212 can include the various MOs, as described below, which contain policies that govern the operation of the system.

Controllers 116

Controllers 116 (e.g., APIC controllers) can provide management, policy programming, application deployment, and health monitoring for Fabric 120.

Node 204

Node 204 includes a tenant container for policies that enable an administrator to exercise domain-based access control. Non-limiting examples of tenants can include:

User tenants defined by the administrator according to the needs of users. They contain policies that govern the operation of resources such as applications, databases, web servers, network-attached storage, virtual machines, and so on.

The common tenant is provided by the system but can be configured by the administrator. It contains policies that govern the operation of resources accessible to all tenants, such as firewalls, load balancers, Layer 4 to Layer 7 services, intrusion detection appliances, and so on.

The infrastructure tenant is provided by the system but can be configured by the administrator. It contains policies that govern the operation of infrastructure resources such as the fabric overlay (e.g., VXLAN). It also enables a fabric provider to selectively deploy resources to one or more user tenants. Infrastructure tenant polices can be configurable by the administrator.

The management tenant is provided by the system but can be configured by the administrator. It contains policies that govern the operation of fabric management functions used for in-band and out-of-band configuration of fabric nodes. The management tenant contains a private out-of-bound address space for the Controller/Fabric internal communications that is outside the fabric data path that provides access through the management port of the switches. The management tenant enables discovery and automation of communications with virtual machine controllers.

Node 206

Node 206 can contain access policies that govern the operation of switch access ports that provide connectivity to resources such as storage, compute, Layer 2 and Layer 3 (bridged and routed) connectivity, virtual machine hypervisors, Layer 4 to Layer 7 devices, and so on. If a tenant requires interface configurations other than those provided in the default link, Cisco Discovery Protocol (CDP), Link Layer Discovery Protocol (LLDP), Link Aggregation Control Protocol (LACP), or Spanning Tree Protocol (STP), an administrator can configure access policies to enable such configurations on the access ports of Leafs 104.

Node 206 can contain fabric policies that govern the operation of the switch fabric ports, including such functions as Network Time Protocol (NTP) server synchronization, Intermediate System-to-Intermediate System Protocol (IS-IS), Border Gateway Protocol (BGP) route reflectors, Domain Name System (DNS) and so on. The fabric MO contains objects such as power supplies, fans, chassis, and so on.

Node 208

Node 208 can contain VM domains that group VM controllers with similar networking policy requirements. VM controllers can share virtual space (e.g., VLAN or VXLAN space) and application EPGs. Controllers 116 communicate with the VM controller to publish network configurations such as port groups that are then applied to the virtual workloads.

Node 210

Node 210 can contain Layer 4 to Layer 7 service integration life cycle automation framework that enables the system to dynamically respond when a service comes online or goes offline. Policies can provide service device package and inventory management functions.

Node 212

Node 212 can contain access, authentication, and accounting (AAA) policies that govern user privileges, roles, and security domains of Fabric 120.

The hierarchical policy model can fit well with an API, such as a REST API interface. When invoked, the API can read from or write to objects in the MIT. URLs can map directly into distinguished names that identify objects in the MIT. Data in the MIT can be described as a self-contained structured tree text document encoded in XML or JSON, for example.

Figure 2B:
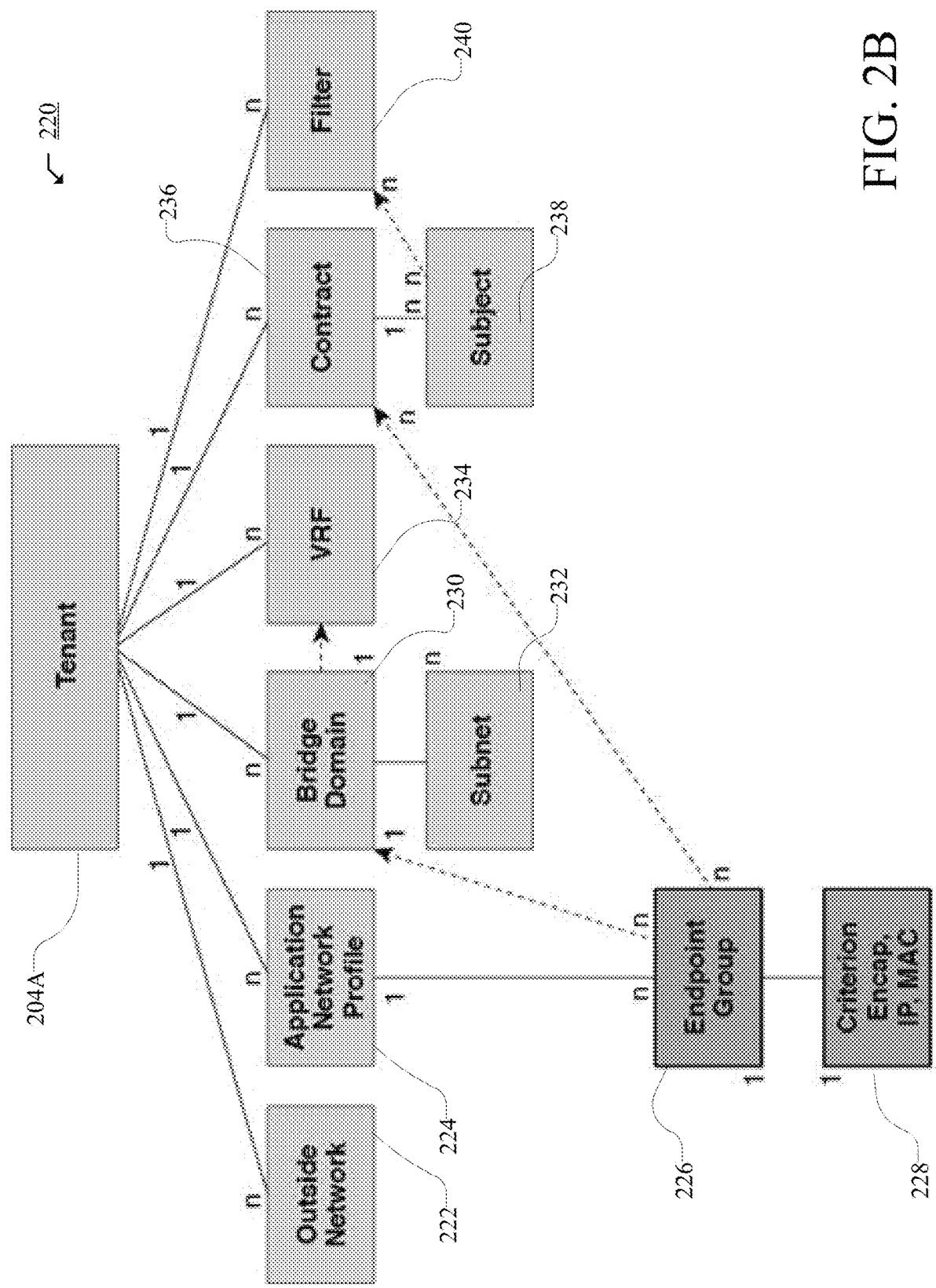
FIG. 2B illustrates an example object model for a tenant object in the example object model from FIG. 2A.

FIG. 2B illustrates an example object model 220 for a tenant portion of MIM 200. As previously noted, a tenant is a logical container for application policies that enable an administrator to exercise domain-based access control. A tenant thus represents a unit of isolation from a policy perspective, but it does not necessarily represent a private network. Tenants can represent a customer in a service provider setting, an organization or domain in an enterprise setting, or just a convenient grouping of policies. Moreover, tenants can be isolated from one another or can share resources.

Tenant portion 204A of MIM 200 can include various entities, and the entities in Tenant Portion 204A can inherit policies from parent entities. Non-limiting examples of entities in Tenant Portion 204A can include Filters 240, Contracts 236, Outside Networks 222, Bridge Domains 230, VRF Instances 234, and Application Profiles 224.

Bridge Domains 230 can include Subnets 232. Contracts 236 can include Subjects 238. Application Profiles 224 can contain one or more EPGs 226. Some applications can contain multiple components. For example, an e-commerce application could require a web server, a database server, data located in a storage area network, and access to outside resources that enable financial transactions. Application Profile 224 contains as many (or as few) EPGs as necessary that are logically related to providing the capabilities of an application.

EPG 226 can be organized in various ways, such as based on the application they provide, the function they provide (such as infrastructure), where they are in the structure of the data center (such as DMZ), or whatever organizing principle that a fabric or tenant administrator chooses to use.

EPGs in the fabric can contain various types of EPGs, such as application EPGs, Layer 2 external outside network instance EPGs, Layer 3 external outside network instance EPGs, management EPGs for out-of-band or in-band access, etc. EPGs 226 can also contain Attributes 228, such as encapsulation-based EPGs, IP-based EPGs, or MAC-based EPGs.

As previously mentioned, EPGs can contain endpoints (e.g., EPs 122) that have common characteristics or attributes, such as common policy requirements (e.g., security, virtual machine mobility (VMM), QoS, or Layer 4 to Layer 7 services). Rather than configure and manage endpoints individually, they can be placed in an EPG and managed as a group.

Policies apply to EPGs, including the endpoints they contain. An EPG can be statically configured by an administrator in Controllers 116, or dynamically configured by an automated system such as VCENTER or OPENSTACK.

To activate tenant policies in Tenant Portion 204A, fabric access policies should be configured and associated with tenant policies. Access policies enable an administrator to configure other network configurations, such as port channels and virtual port channels, protocols such as LLDP, CDP, or LACP, and features such as monitoring or diagnostics.

Figure 2C:
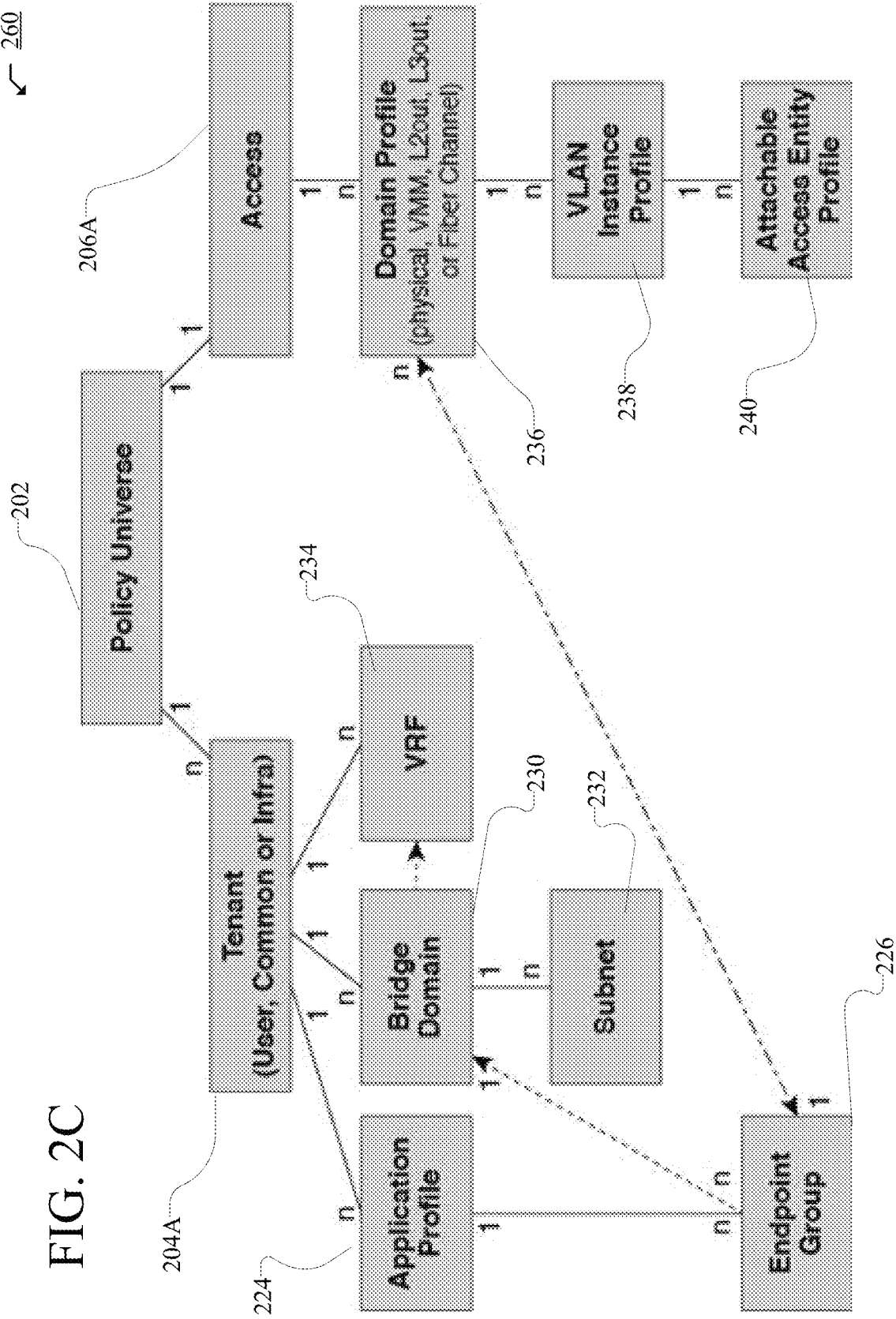
FIG. 2C illustrates an example association of various objects in the example object model from FIG. 2A.

FIG. 2C illustrates an example Association 260 of tenant entities and access entities in MIM 200. Policy Universe 202 contains Tenant Portion 204A and Access Portion 206A. Thus, Tenant Portion 204A and Access Portion 206A are associated through Policy Universe 202.

Access Portion 206A can contain fabric and infrastructure access policies. Typically, in a policy model, EPGs are coupled with VLANs. For traffic to flow, an EPG is deployed on a leaf port with a VLAN in a physical, VMM, L2 out, L3 out, or Fiber Channel domain, for example.

Access Portion 206A thus contains Domain Profile 236 which can define a physical, VMM, L2 out, L3 out, or Fiber Channel domain, for example, to be associated to the EPGs. Domain Profile 236 contains VLAN Instance Profile 238 (e.g., VLAN pool) and Attacheable Access Entity Profile (AEP) 240, which are associated directly with application EPGs. The AEP 240 deploys the associated application EPGs to the ports to which it is attached, and automates the task of assigning VLANs. While a large data center can have thousands of active VMs provisioned on hundreds of VLANs, Fabric 120 can automatically assign VLAN IDs from VLAN pools. This saves time compared with trunking down VLANs in a traditional data center.

Figure 2D:
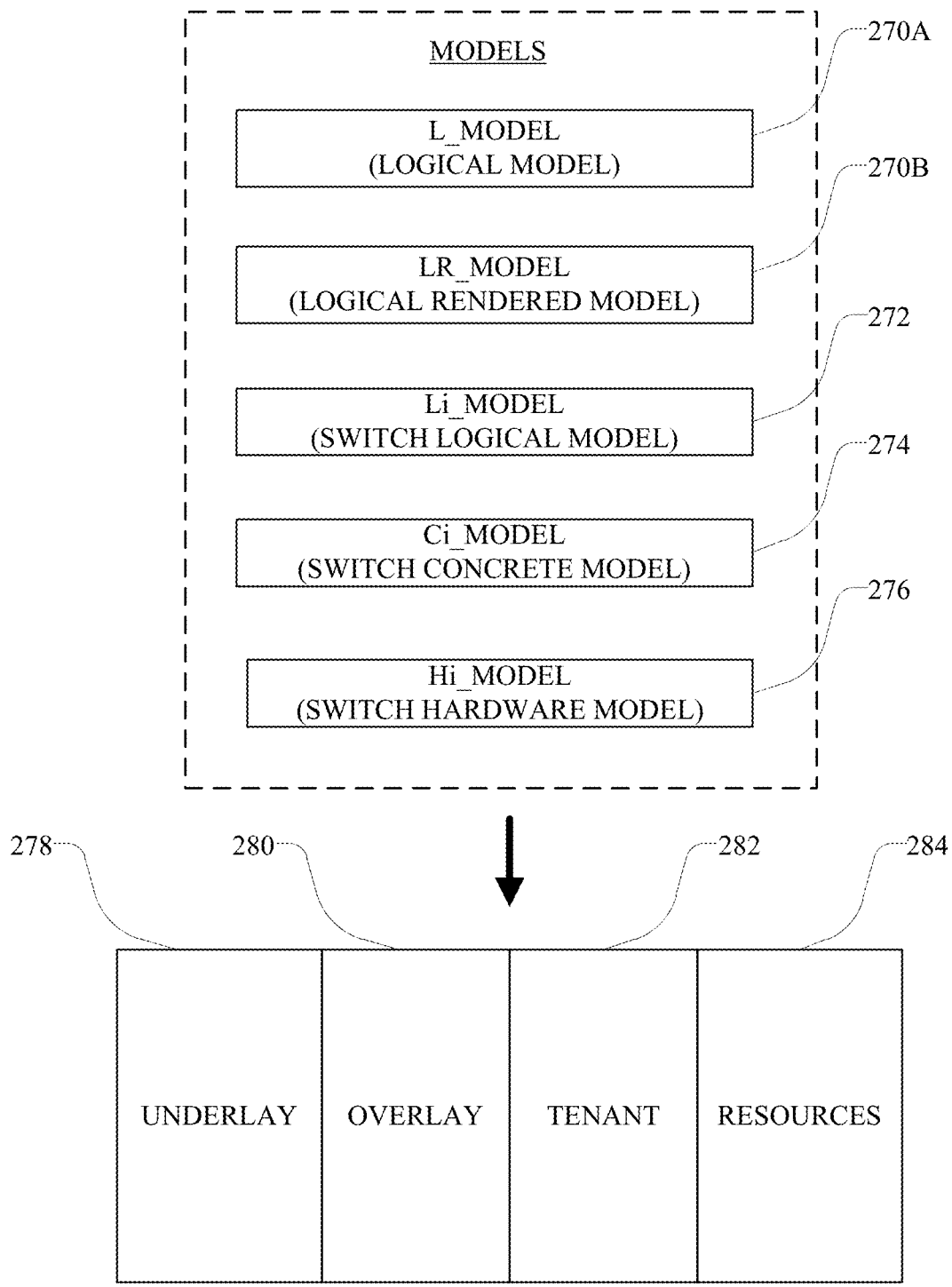
FIG. 2D illustrates a schematic diagram of example models for implementing the example object model from FIG. 2A.

FIG. 2D illustrates a schematic diagram of example models for implementing MIM 200. The network assurance models can include L_Model 270A (Logical Model), LR_Model 270B (Logical Rendered Model or Logical Runtime Model), Li_Model 272 (Logical Model for i), Ci_Model 274 (Concrete model for i), and Hi_Model 276 (Hardware model or TCAM Model for i).

L_Model 270A is the logical representation of the objects and their relationships in MIM 200. L_Model 270A can be generated by Controllers 116 based on configurations entered in Controllers 116 for the network, and thus represents the configurations of the network at Controllers 116. This is the declaration of the "end-state" expression that is desired when the elements of the network entities (e.g., applications) are connected and Fabric 120 is provisioned by Controllers 116. In other words, because L_Model 270A represents the configurations entered in Controllers 116, including the objects and relationships in MIM 200, it can also reflect the "intent" of the administrator: how the administrator wants the network and network elements to behave.

LR_Model 270B is the abstract model expression that Controllers 116 (e.g., APICs in ACI) resolve from L_Model 270A. LR_Model 270B can thus provide the elemental configuration components that would be delivered to the physical infrastructure (e.g., Fabric 120) to execute one or more policies. For example, LR_Model 270B can be delivered to Leafs 104 in Fabric 120 to configure Leafs 104 for communication with attached Endpoints 122.

Li_Model 272 is a switch-level or switch-specific model obtained from Logical Model 270A and/or Resolved Model 270B. For example, Li_Model 272 can represent the portion of L_Model 270A and/or LR_Model 270B pertaining to a specific switch or router i. To illustrate, Li_Model 272 $L_1$ can represent the portion of L_Model 270A and/or LR_Model 270B pertaining to Leaf 1 (104). Thus, Li_Model 272 can be generated from L_Model 270A and/or LR_Model 270B for one or more switch or routers (e.g., Leafs 104 and/or Spines 102) on Fabric 120.

Ci_Model 274 is the actual in-state configuration at the individual fabric member i (e.g., switch i). In other words, Ci_Model 274 is a switch-level or switch-specific model that is based on Li_Model 272. For example, Controllers 116 can deliver Li_Model 272 to Leaf 1 (104). Leaf 1 (104) can take Li_Model 272, which can be specific to Leaf 1 (104), and render the policies in Li_Model 272 into a concrete model, Ci_Model 274, that runs on Leaf 1 (104). Leaf 1 (104) can render Li_Model 272 via the OS on Leaf 1 (104), for example. Thus, Ci_Model 274 can be analogous to compiled software, as it is the form of Li_Model 272 that the switch OS at Leaf 1 (104) can execute.

Hi_Model 276 is also a switch-level or switch-specific model for switch i, but is based on Ci_Model 274 for switch i. Hi_Model 276 is the actual configuration (e.g., rules) stored or rendered on the hardware or memory (e.g., TCAM memory) at the individual fabric member i (e.g., switch i). For example, Hi_Model 276 can represent the configurations (e.g., rules) which Leaf 1 (104) stores or renders on the hardware (e.g., TCAM memory) of Leaf 1 (104) based on Ci_Model 274 at Leaf 1 (104). The switch OS at Leaf 1 (104) can render or execute Ci_Model 274, and Leaf 1 (104) can store or render the configurations from Ci Model in storage, such as the memory or TCAM at Leaf 1 (104). The configurations from Hi_Model 276 stored or rendered by Leaf 1 (104) represent the configurations that will be implemented by Leaf 1 (104) when processing traffic.

While Models 272, 274, 276 are shown as device-specific models, similar models can be generated or aggregated for a collection of fabric members (e.g., Leafs 104 and/or Spines 102) in Fabric 120. When combined, device-specific models, such as Model 272, Model 274, and/or Model 276, can provide a representation of Fabric 120 that extends beyond a particular device. For example, in some cases, Li_Model 272, Ci Model 272, and/or Hi Model 272 associated with some or all individual fabric members (e.g., Leafs 104 and Spines 102) can be combined or aggregated to generate one or more aggregated models based on the individual fabric members.

As referenced herein, the terms H Model, T Model, and TCAM Model can be used interchangeably to refer to a hardware model, such as Hi_Model 276. For example, Ti Model, Hi Model and TCAMi Model may be used interchangeably to refer to Hi_Model 276.

Models 270A, 270B, 272, 274, 276 can provide representations of various aspects of the network or various configuration stages for MIM 200. For example, one or more of Models 270A, 270B, 272, 274, 276 can be used to generate Underlay Model 278 representing one or more aspects of Fabric 120 (e.g., underlay topology, routing, etc.), Overlay Model 280 representing one or more aspects of the overlay or logical segment(s) of Network Environment 100 (e.g., COOP, MPBGP, tenants, VRFs, VLANs, VXLANs, virtual applications, VMs, hypervisors, virtual switching, etc.), Tenant Model 282 representing one or more aspects of Tenant portion 204A in MIM 200 (e.g., security, forwarding, service chaining, QoS, VRFs, BDs, Contracts, Filters, EPGs, subnets, etc.), Resources Model 284 representing one or more resources in Network Environment 100 (e.g., storage, computing, VMs, port channels, physical elements, etc.), etc.

In general, L_Model 270A can be the high-level expression of what exists in the LR_Model 270B, which should be present on the concrete devices as Ci_Model 274 and Hi_Model 276 expression. If there is any gap between the models, there may be inconsistent configurations or problems.

Figure 3A:
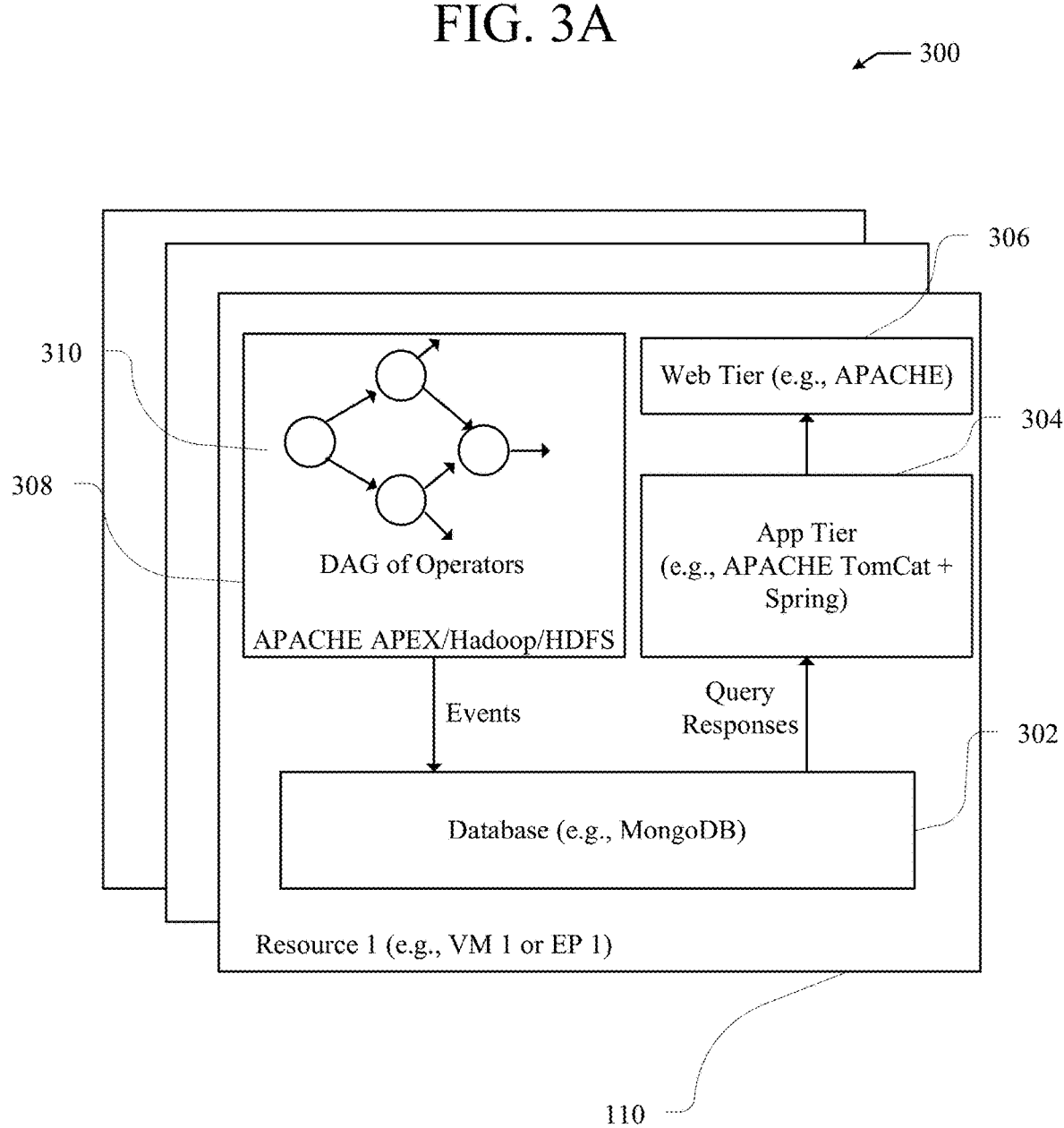
FIG. 3A illustrates an example network assurance appliance.

FIG. 3A illustrates a diagram of an example Assurance Appliance 300 for network assurance. In this example, Assurance Appliance 300 can include k VMs 110 operating in cluster mode. VMs are used in this example for explanation purposes. However, it should be understood that other configurations are also contemplated herein, such as use of containers, bare metal devices, Endpoints 122, or any other physical or logical systems. Moreover, while FIG. 3A illustrates a cluster mode configuration, other configurations are also contemplated herein, such as a single mode configuration (e.g., single VM, container, or server) or a service chain for example.

Assurance Appliance 300 can run on one or more Servers 106, VMs 110, Hypervisors 108, EPs 122, Leafs 104, Controllers 116, or any other system or resource. For example, Assurance Appliance 300 can be a logical service or application running on one or more VMs 110 in Network Environment 100.

The Assurance Appliance 300 can include Data Framework 308, which can be based on, for example, APACHE APEX and HADOOP. In some cases, assurance checks can be written as individual operators that reside in Data Framework 308. This enables a natively horizontal scale-out architecture that can scale to arbitrary number of switches in Fabric 120 (e.g., ACI fabric).

Assurance Appliance 300 can poll Fabric 120 at a configurable periodicity (e.g., an epoch). The analysis workflow can be setup as a DAG (Directed Acyclic Graph) of Operators 310, where data flows from one operator to another and eventually results are generated and persisted to Database 302 for each interval (e.g., each epoch).

The north-tier implements API Server (e.g., APACHE Tomcat and Spring framework) 304 and Web Server 306. A graphical user interface (GUI) interacts via the APIs exposed to the customer. These APIs can also be used by the customer to collect data from Assurance Appliance 300 for further integration into other tools.

Operators 310 in Data Framework 308 (e.g., APEX/Hadoop) can together support assurance operations. Below are non-limiting examples of assurance operations that can be performed by Assurance Appliance 300 via Operators 310.

Security Policy Adherence

Assurance Appliance 300 can check to make sure the configurations or specification from L_Model 270A, which may reflect the user's intent for the network, including for example the security policies and customer-configured contracts, are correctly implemented and/or rendered in Li_Model 272, Ci_Model 274, and Hi_Model 276, and thus properly implemented and rendered by the fabric members (e.g., Leafs 104), and report any errors, contract violations, or irregularities found.

Static Policy Analysis

Assurance Appliance 300 can check for issues in the specification of the user's intent or intents (e.g., identify contradictory or conflicting policies in L_Model 270A).

TCAM Utilization

TCAM is a scarce resource in the fabric (e.g., Fabric 120). However, Assurance Appliance 300 can analyze the TCAM utilization by the network data (e.g., Longest Prefix Match (LPM) tables, routing tables, VLAN tables, BGP updates, etc.), Contracts, Logical Groups 118 (e.g., EPGs), Tenants, Spines 102, Leafs 104, and other dimensions in Network Environment 100 and/or objects in MIM 200, to provide a network operator or user visibility into the utilization of this scarce resource. This can greatly help for planning and other optimization purposes.

Endpoint Checks

Assurance Appliance 300 can validate that the fabric (e.g. fabric 120) has no inconsistencies in the Endpoint information registered (e.g., two leafs announcing the same endpoint, duplicate subnets, etc.), among other such checks.

Tenant Routing Checks

Assurance Appliance 300 can validate that BDs, VRFs, subnets (both internal and external), VLANs, contracts, filters, applications, EPGs, etc., are correctly programmed.

Infrastructure Routing

Assurance Appliance 300 can validate that infrastructure routing (e.g., IS-IS protocol) has no convergence issues leading to black holes, loops, flaps, and other problems.

MP-BGP Route Reflection Checks

The network fabric (e.g., Fabric 120) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Logical Lint and Real-Time Change Analysis

Assurance Appliance 300 can validate rules in the specification of the network (e.g., L_Model 270A) are complete and do not have inconsistencies or other problems. MOs in the MIM 200 can be checked by Assurance Appliance 300 through syntactic and semantic checks performed on L_Model 270A and/or the associated configurations of the MOs in MIM 200. Assurance Appliance 300 can also verify that unnecessary, stale, unused or redundant configurations, such as contracts, are removed.

Figure 3B:
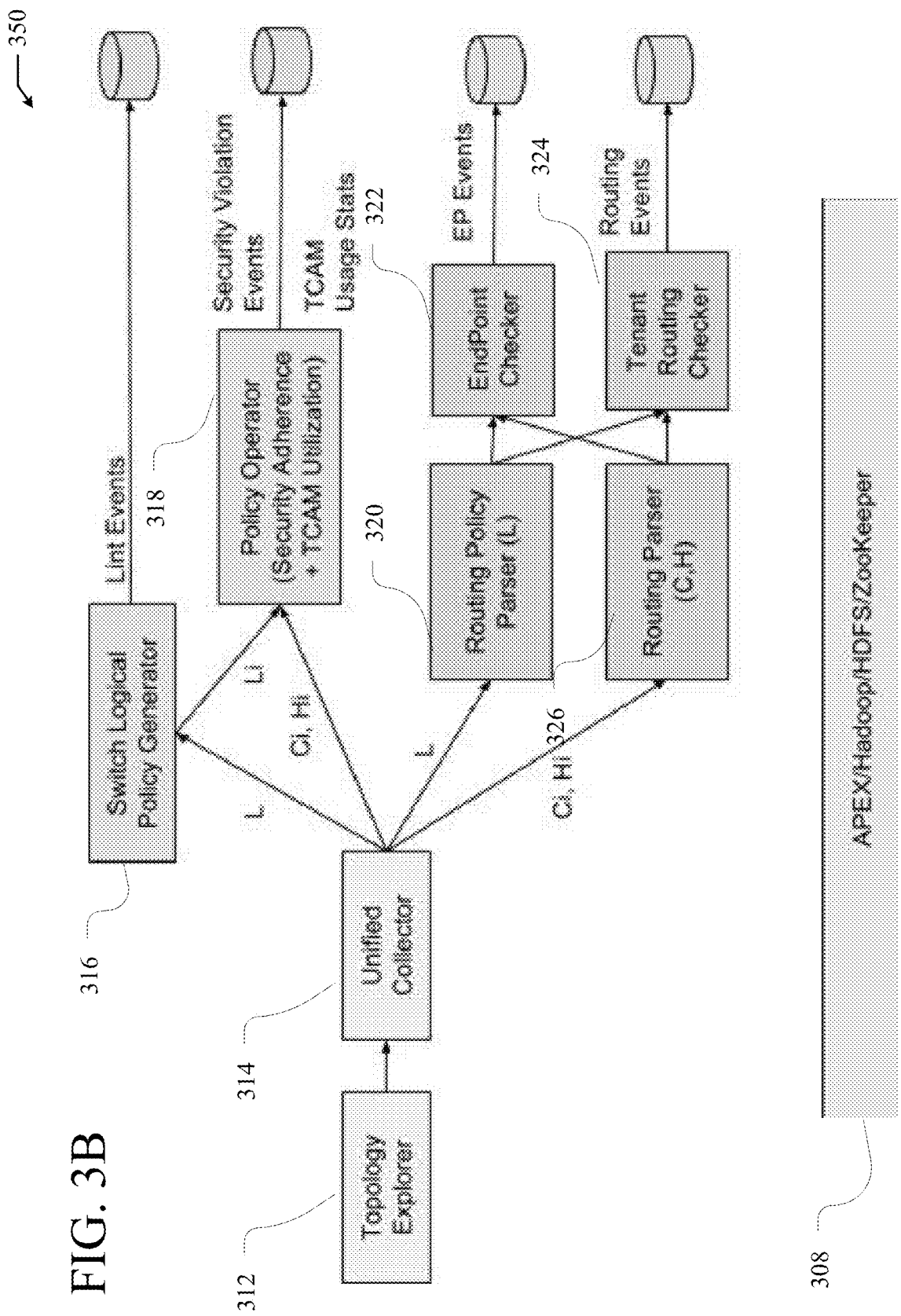
FIG. 3B illustrates an example system for network assurance.

FIG. 3B illustrates an architectural diagram of an example system 350 for network assurance. In some cases, system 350 can correspond to the DAG of Operators 310 previously discussed with respect to FIG. 3A In this example, Topology Explorer 312 communicates with Controllers 116 (e.g., APIC controllers) in order to discover or otherwise construct a comprehensive topological view of Fabric 120 (e.g., Spines 102, Leafs 104, Controllers 116, Endpoints 122, and any other components as well as their interconnections). While various architectural components are represented in a singular, boxed fashion, it is understood that a given architectural component, such as Topology Explorer 312, can correspond to one or more individual Operators 310 and may include one or more nodes or endpoints, such as one or more servers, VMs, containers, applications, service functions (e.g., functions in a service chain or virtualized network function), etc.

Topology Explorer 312 is configured to discover nodes in Fabric 120, such as Controllers 116, Leafs 104, Spines 102, etc. Topology Explorer 312 can additionally detect a majority election performed amongst Controllers 116, and determine whether a quorum exists amongst Controllers 116. If no quorum or majority exists, Topology Explorer 312 can trigger an event and alert a user that a configuration or other error exists amongst Controllers 116 that is preventing a quorum or majority from being reached. Topology Explorer 312 can detect Leafs 104 and Spines 102 that are part of Fabric 120 and publish their corresponding out-of-band management network addresses (e.g., IP addresses) to downstream services. This can be part of the topological view that is published to the downstream services at the conclusion of Topology Explorer's 312 discovery epoch (e.g., 5 minutes, or some other specified interval).

Unified Collector 314 can receive the topological view from Topology Explorer 312 and use the topology information to collect information for network assurance from Fabric 120. Such information can include L_Model 270A and/or LR_Model 270B from Controllers 116, switch software configurations (e.g., Ci_Model 274) from Leafs 104 and/or Spines 102, hardware configurations (e.g., Hi_Model 276) from Leafs 104 and/or Spines 102, etc. Unified Collector 314 can collect Ci_Model 274 and Hi_Model 276 from individual fabric members (e.g., Leafs 104 and Spines 102).

Unified Collector 314 can poll the devices that Topology Explorer 312 discovers in order to collect data from Fabric 120 (e.g., from the constituent members of the fabric). Unified Collector 314 can collect the data using interfaces exposed by Controller 116 and/or switch software (e.g., switch OS), including, for example, a Representation State Transfer (REST) Interface and a Secure Shell (SSH) Interface.

In some cases, Unified Collector 314 collects L_Model 270A, LR_Model 270B, and/or Ci_Model 274 via a REST API, and the hardware information (e.g., configurations, tables, fabric card information, rules, routes, etc.) via SSH using utilities provided by the switch software, such as virtual shell (VSH or VSHELL) for accessing the switch command-line interface (CLI) or VSH_LC shell for accessing runtime state of the line card.

Unified Collector 314 can poll other information from Controllers 116, including: topology information, tenant forwarding/routing information, tenant security policies, contracts, interface policies, physical domain or VMM domain information, OOB (out-of-band) management IP's of nodes in the fabric, etc.

Unified Collector 314 can also poll other information from Leafs 104 and Spines 102, such as: Ci Models 274 for VLANs, BDs, security policies, Link Layer Discovery Protocol (LLDP) connectivity information of Leafs 104 and/or Spines 102, endpoint information from EPM/COOP, fabric card information from Spines 102, routing information base (RIB) tables, forwarding information base (FIB) tables from Leafs 104 and/or Spines 102, security group hardware tables (e.g., TCAM tables) from switches, etc.

Assurance Appliance 300 can run one or more instances of Unified Collector 314. For example, Assurance Appliance 300 can run one, two, three, or more instances of Unified Collector 314. The task of data collecting for each node in the topology (e.g., Fabric 120 including Spines 102, Leafs 104, Controllers 116, etc.) can be sharded or load balanced, to a unique instance of Unified Collector 314. Data collection across the nodes can thus be performed in parallel by one or more instances of Unified Collector 314. Within a given node, commands and data collection can be executed serially. Assurance Appliance 300 can control the number of threads used by each instance of Unified Collector 314 to poll data from Fabric 120.

Data collected by Unified Collector 314 can be compressed and sent to downstream services. In some examples, Unified Collector 314 can collect data in an online fashion or real-time fashion, and send the data downstream, as it is collected, for further analysis. In some examples, Unified Collector 314 can collect data in an offline fashion, and compile the data for later analysis or transmission.

Assurance Appliance 300 can contact Controllers 116, Spines 102, Leafs 104, and other nodes to collect various types of data. In some scenarios, Assurance Appliance 300 may experience a failure (e.g., connectivity problem, hardware or software error, etc.) that prevents it from being able to collect data for a period of time. Assurance Appliance 300 can handle such failures seamlessly, and generate events based on such failures.

Switch Logical Policy Generator 316 can receive L_Model 270A and/or LR_Model 270B from Unified Collector 314 and calculate Li_Model 272 for each network device i (e.g., switch i) in Fabric 120. For example, Switch Logical Policy Generator 316 can receive L_Model 270A and/or LR_Model 270B and generate Li_Model 272 by projecting a logical model for each individual node i (e.g., Spines 102 and/or Leafs 104) in Fabric 120. Switch Logical Policy Generator 316 can generate Li_Model 272 for each switch in Fabric 120, thus creating a switch logical model based on L_Model 270A for each switch.

Switch Logical Configuration Generator 316 can also perform change analysis and generate lint events or records for problems discovered in L_Model 270A and/or LR_Model 270B. The lint events or records can be used to generate alerts for a user or network operator.

Policy Operator 318 can receive Ci_Model 274 and Hi_Model 276 for each switch from Unified Collector 314, and Li_Model 272 for each switch from Switch Logical Policy Generator 316, and perform assurance checks and analysis (e.g., security adherence checks, TCAM utilization analysis, etc.) based on Ci_Model 274, Hi_Model 276, and Li_Model 272. Policy Operator 318 can perform assurance checks on a switch-by-switch basis by comparing one or more of the models.

Returning to Unified Collector 314, Unified Collector 314 can also send L_Model 270A and/or LR_Model 270B to Routing Policy Parser 320, and Ci_Model 274 and Hi_Model 276 to Routing Parser 326.

Routing Policy Parser 320 can receive L_Model 270A and/or LR_Model 270B and parse the model(s) for information that may be relevant to downstream operators, such as Endpoint Checker 322 and Tenant Routing Checker 324. Similarly, Routing Parser 326 can receive Ci_Model 274 and Hi_Model 276 and parse each model for information for downstream operators, Endpoint Checker 322 and Tenant Routing Checker 324.

After Ci_Model 274, Hi_Model 276, L_Model 270A and/or LR_Model 270B are parsed, Routing Policy Parser 320 and/or Routing Parser 326 can send cleaned-up protocol buffers (Proto Buffs) to the downstream operators, Endpoint Checker 322 and Tenant Routing Checker 324. Endpoint Checker 322 can then generate events related to Endpoint violations, such as duplicate IPs, APIPA, etc., and Tenant Routing Checker 324 can generate events related to the deployment of BDs, VRFs, subnets, routing table prefixes, etc.

Figure 3C:
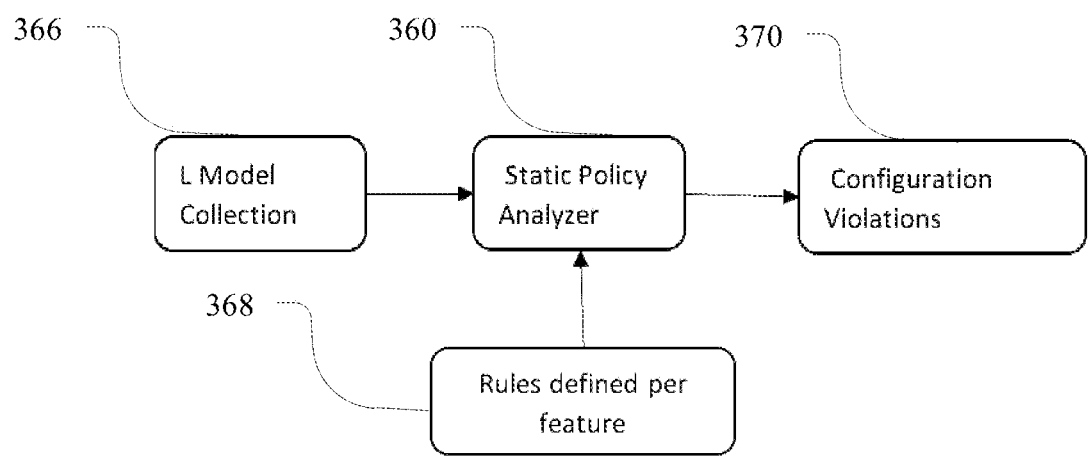
FIG. 3C illustrates an example system for static policy analysis in a network.

FIG. 3C illustrates a schematic diagram of an example system for static policy analysis in a network (e.g., Network Environment 100). Static Policy Analyzer 360 can perform assurance checks to detect configuration violations, logical lint events, contradictory or conflicting policies, unused contracts, incomplete configurations, etc. Static Policy Analyzer 360 can check the specification of the user's intent or intents in L_Model 270A to determine if any configurations in Controllers 116 are inconsistent with the specification of the user's intent or intents.

Static Policy Analyzer 360 can include one or more of the Operators 310 executed or hosted in Assurance Appliance 300. However, in other configurations, Static Policy Analyzer 360 can run one or more operators or engines that are separate from Operators 310 and/or Assurance Appliance 300. For example, Static Policy Analyzer 360 can be a VM, a cluster of VMs, or a collection of endpoints in a service function chain.

Static Policy Analyzer 360 can receive as input L_Model 270A from Logical Model Collection Process 366 and Rules 368 defined for each feature (e.g., object) in L_Model 270A. Rules 368 can be based on objects, relationships, definitions, configurations, and any other features in MIM 200. Rules 368 can specify conditions, relationships, parameters, and/or any other information for identifying configuration violations or issues.

Moreover, Rules 368 can include information for identifying syntactic violations or issues. For example, Rules 368 can include one or more rules for performing syntactic checks. Syntactic checks can verify that the configuration of L_Model 270A is complete, and can help identify configurations or rules that are not being used. Syntactic checks can also verify that the configurations in the hierarchical MIM 200 are complete (have been defined) and identify any configurations that are defined but not used. To illustrate, Rules 368 can specify that every tenant in L_Model 270A should have a context configured configured; every contract in L_Model 270A should specify a provider EPG and a consumer EPG; every contract in L_Model 270A should specify a subject, filter, and/or port; etc.

Rules 368 can also include rules for performing semantic checks and identifying semantic violations or issues. Semantic checks can check conflicting rules or configurations. For example, Rule1 and Rule2 can have aliasing issues, Rule1 can be more specific than Rule2 and thereby create conflicts/issues, etc. Rules 368 can define conditions which may result in aliased rules, conflicting rules, etc. To illustrate, Rules 368 can specify that an allow policy for a specific communication between two objects can conflict with a deny policy for the same communication between two objects if the allow policy has a higher priority than the deny policy, or a rule for an object renders another rule unnecessary.

Static Policy Analyzer 360 can apply Rules 368 to L_Model 270A to check configurations in L_Model 270A and output Configuration Violation Events 370 (e.g., alerts, logs, notifications, etc.) based on any issues detected. Configuration Violation Events 370 can include semantic or semantic problems, such as incomplete configurations, conflicting configurations, aliased rules, unused configurations, errors, policy violations, misconfigured objects, incomplete configurations, incorrect contract scopes, improper object relationships, etc.

In some cases, Static Policy Analyzer 360 can iteratively traverse each node in a tree generated based on L_Model 270A and/or MIM 200, and apply Rules 368 at each node in the tree to determine if any nodes yield a violation (e.g., incomplete configuration, improper configuration, unused configuration, etc.). Static Policy Analyzer 360 can output Configuration Violation Events 370 when it detects any violations.

Figure 4:
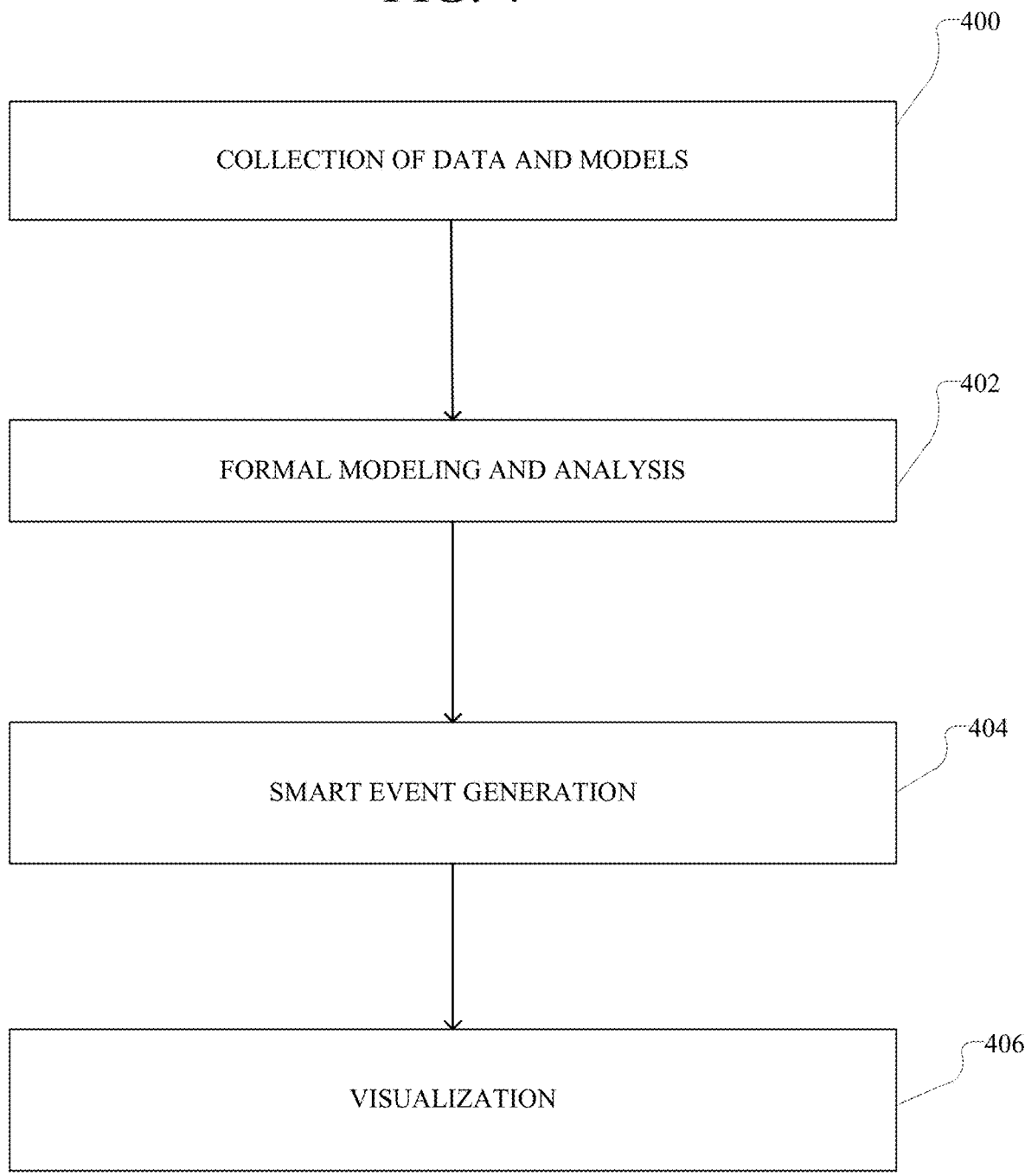
FIG. 4 illustrates an example method embodiment for network assurance.

FIG. 4 illustrates a flowchart for an example network assurance method. The method shown in FIG. 4 is provided by way of example, as there are a variety of ways to carry out the method. Additionally, while the example method is illustrated with a particular order of blocks, those of ordinary skill in the art will appreciate that FIG. 4 and the blocks shown therein can be executed in any order and can include fewer or more blocks than illustrated.

Each block shown in FIG. 4 represents one or more steps, processes, methods or routines in the method. For the sake of clarity and explanation purposes, the blocks in FIG. 4 are described with reference to Assurance Appliance 300, Models 270A-B, 272, 274, 276, and Network Environment 100, as shown in FIGS. 1A-B, 2D, and 3A.

At step 400, Assurance Appliance 300 can collect data and obtain models associated with Network Environment 100. The models can include Models 270A-B, 272, 274, 276. The data can include fabric data (e.g., topology, switch, interface policies, application policies, EPGs, etc.), network configurations (e.g., BDs, VRFs, L2 Outs, L3 Outs, protocol configurations, etc.), security configurations (e.g., contracts, filters, etc.), service chaining configurations, routing configurations, and so forth. Other information collected or obtained can include, for example, network data (e.g., RIB/FIB, VLAN, MAC, ISIS, DB, BGP, OSPF, ARP, VPC, LLDP, MTU, QoS, etc.), rules and tables (e.g., TCAM rules, ECMP tables, etc.), endpoint dynamics (e.g., EPM, COOP EP DB, etc.), statistics (e.g., TCAM rule hits, interface counters, bandwidth, etc.).

At step 402, Assurance Appliance 300 can analyze and model the received data and models. For example, Assurance Appliance 300 can perform formal modeling and analysis, which can involve determining equivalency between models, including configurations, policies, etc.

At step 404, Assurance Appliance 300 can generate one or more smart events. Assurance Appliance 300 can generate smart events using deep object hierarchy for detailed analysis, such as Tenants, switches, VRFs, rules, filters, routes, prefixes, ports, contracts, subjects, etc.

At step 406, Assurance Appliance 300 can visualize the smart events, analysis and/or models. Assurance Appliance 300 can display problems and alerts for analysis and debugging, in a user-friendly GUI.

Figure 5:
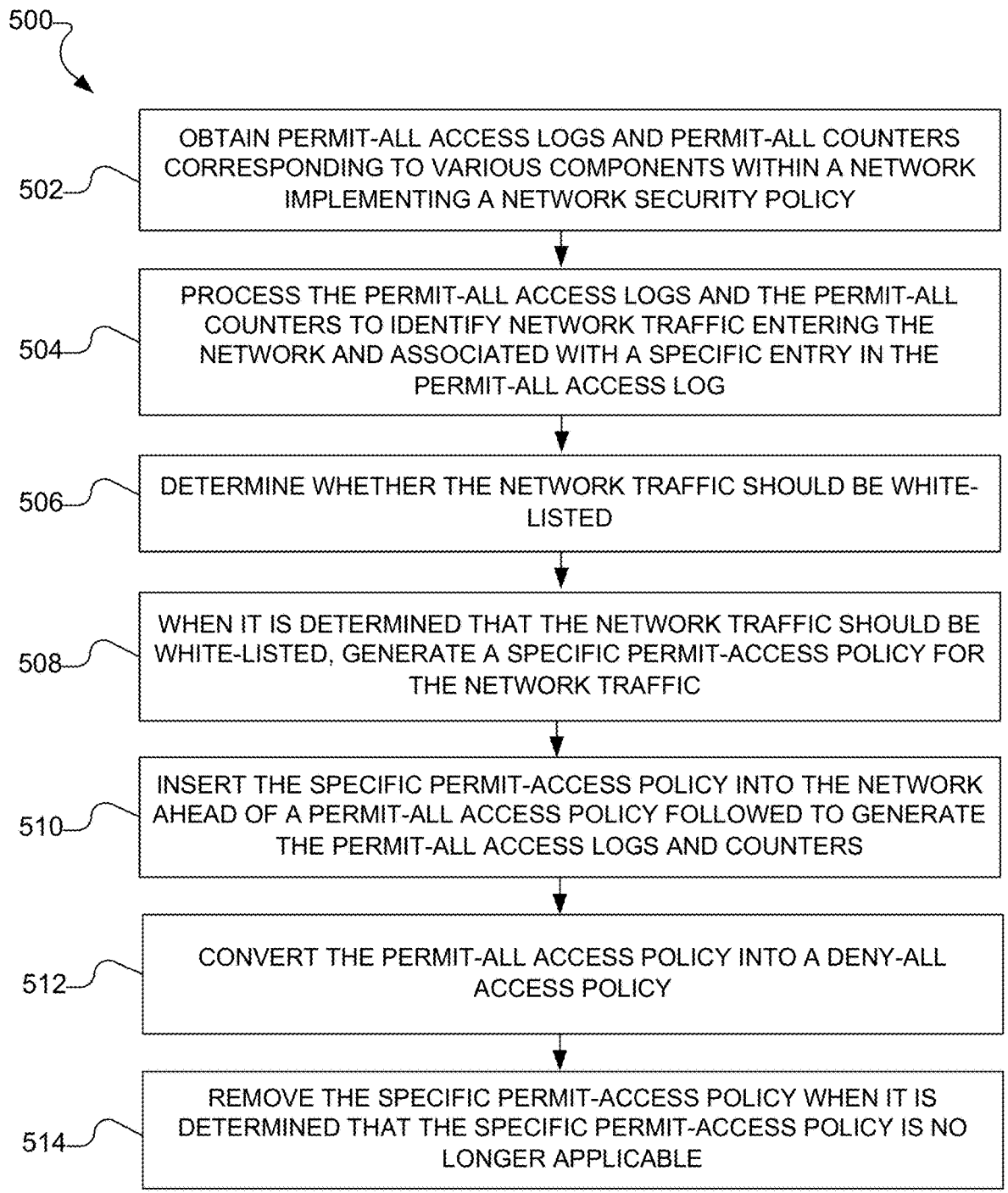
FIG. 5 illustrates an example method or process for migrating to a white-list security model.

FIG. 5 provides another type of network assurance check involving migrating to and maintaining white-list security models. In particular, FIG. 5 provides an example method 500 for migrating to a white list security model and subsequently maintaining the white-list security model throughout a network.

Generally speaking, a white-list security model defines and maintains a list or register of entities that are being provided a particular privilege, service, mobility, access or recognition. Entities included in the list and/or register will be accepted, approved, and/or recognized for such purposes. Stated differently, a white-list tests a desired input against a list of possible correct input's. Thus, the white-list (a compilation of all the good input values/conditions) is used to verify that the received input satisfies one of the correct conditions. Alternatively, black-listing or a employing a black-list security model is the practice of identifying entities in the list or register that are denied a particular privilege, service, mobility, access or recognition. Stated differently, a black-list is tests a desired input against a list of negative input's. Thus, the black-list (a compilation of all the negative or bad conditions) is used to verify that the input received is not one of the bad or negative conditions included in the black list.

Within networking environments, such as the network environment 100, typically black-list security models are implemented. However, explicitly denying traffic via a black-list may not be the most effective or productive way to manage and protect a network environment. As the unauthorized and invalid access attempts increase, a given black-list continues to grow, which makes the black-list very challenging to maintain. Moreover, while black-listing can stop traffic that is known to be bad (i.e., in included in the blacklist), black-listing cannot stop traffic that is bad or malicious, but not known (i.e., not included in the blacklist). White-listing resolves some of these issues because it much easier to identify and manage acceptable and good traffic than it is to continually update a known list of bad and/or unacceptable traffic (i.e., a black-list). Thus, FIG. 5 provides a method through which a black-list, or other type of security network policy, can be migrated to a white-list, wherein the white-list may be subsequently maintained by the network. Thus, the present disclosure involves a process that automatically converts a black-list to a white-list, as a white-list is more secure than a black-list because all network traffic except for traffic associated with entries in the white-list. Stated differently, the system and methods disclosed herein may be used to automatically transition from an existing black-list to a white-list, using existing network architecture components (the permit logs and counter) to identify what traffic should be included as acceptable and therefor included in the white-list network. The white-list can be generated without having to take down any portions of the active network. Stated differently, the current network implementing a black-list model can still be employed to manage network traffic attempting access, up and until the instant at which the black-list is actually converted to a white-list.

Referring specifically to the steps of FIG. 5, process 500, begins at 502, with obtaining a plurality of permit-all access logs and permit-all counters corresponding to various components included within a network implementing a network security policy. The permit-all access logs and counters can be generated from events generated for a network environment, e.g. by one or more network assurance appliances. Additionally, the permit-all access logs and counters can be generated in accordance with a permit-all and log access policy. For example, a permit-all and log access policy can be implemented that specifies to generate access logs for all network traffic that has been or has not already been forwarded. Further in the example, the permit-all and log access policy can specify forwarding all network traffic that has been or has not already been forward, e.g. according to a specific permit-access policy.

The permit-all access logs can identify the network traffic that enters the network and the permit-all counters maintain a count of how many times unique network traffic enters the network. In particular, "permit-all" logs and/or "permit all" counters", such as for example, ACL logs stored in TCAM memory, may be accessed to determine how certain network traffic (e.g., email addresses, users, passwords, URLs, IP addresses, domain names, file hashes, etc.) is currently being forwarded or blocked within the network environment 100. Such "permit-all" logs and "permit all" counters may be maintained at hundreds of different points (e.g., at different TCAMs) within the network environment 100. Thus, all or substantially all of the "permit-all" logs and "permit-all" counters may be obtained, collected, and/or aggregated.

At 504, the aggregated "permit-all" logs and "permit-all" counters are processed to identify specific network traffic entering the network that is associated with a specific entry in the "permit-all" logs. More specifically, network traffic is identified based on the entries included in the "permit-all" logs that correspond to entries in the "permit-all" counters. For example, assume network traffic associated with a particular IP address is included in the "permit-all" access log, wherein the entry includes the IP address and a time stamp (or other unique identifier) that identifies when the entry was logged. In the corresponding "permit-all" counter, there is an entry with a matching time stamp (or other unique identifier) that has increased or otherwise been incremented to indicate that entries to the "permit-all" access log had occurred. Thus, by matching the time stamp of the entry in the "permit-all" access log with the "permit-all" counter, it can be determined what traffic (in this example, the IP address) triggered the increment in the "permit-all" counter.

At 506, a determination is made as to whether the identified network traffic should be white-listed. In one specific example, network traffic may be identified by a network administrator that pre-defines what network traffic is acceptable network traffic and therefore should be allowed within the network. At 508, when it is determined that the traffic should be white-listed, a specific permit-access policy and corresponding access and counters are generated for the identified network traffic. Referring to the IP address example above, when it is determined that network traffic associated with the IP address should be white-listed then a permit-access policy for traffic corresponding to the IP address is generated. Alternatively, when it is determined that the traffic should not be white-listed, then a specific deny-access policy is generated.

At 510, the generated permit-access policy is inserted into the network. For example, referring to the IP address example, after the access policy is generated, the policy is inserted or otherwise implemented at the applicable switch within the network environment 100 to ensure that all traffic associated with the IP address is properly routed (either allowed or denied). The generated permit-access policy is inserted into the network ahead of a permit-all access policy followed to generate the permit-all access logs and counters. By inserting the permit-access policy ahead of the permit-all access policy, the permit-access policy is followed by the permit-all access policy. More specifically, the network traffic that is white-listed, e.g. corresponding to the permit-access policy is forwarded without being logged in the permit-all access logs and permit-all counters according to the permit-all access policy.

The process for identifying network traffic for white-listing is an iterative process that may be continuously performed so that more and more specific access policies may be generated that govern specific network traffic routed throughout the network environment 100 that either permit or deny specific network traffic. Eventually, most of the traffic will be governed by a special access policy and none of the traffic will flow through the permit-all access log and corresponding "permit-all" access counter. Accordingly, a true white-list based access policy is effectively implemented in the network.

At step 512, the permit-all access policy is converted into a deny-all access policy. Specifically, the "permit-all" access log can be switched from a "permit-all" access log to a "deny-all" access log and thereby migrate the network environment 100 to a network that is governed by a full white-list security policy network. As most traffic will be governed by one or more specific permit-access policies inserted before the permit-all access policy, traffic that is not governed by the specific permit-access policies will be blocked. More specifically, traffic that is not governed by the specific permit-access policies will be governed by the permit-all access policy converted into a deny-all access policy, thereby blocking the traffic it is not governed by the specific permit-access policies.

At 514, one or more of the generated specific permit-access policies may be removed if/when it is determined that the specific permit-access policy is no longer needed. In particular, the applicable access and/or counters (e.g., Specific permit policies TCAM counters and permit policy logs and/or specific deny policies TCAM counters and deny policy logs) for the generated specific access policy will be analyzed and if the count is not incrementing over a specific period of time, it may be determined that the specific access policy is no longer needed. Thus, the log is removed from the network environment 100.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method for migrating to a white-list security policy comprising:
   identifying, using at least one processing device, first network traffic associated with at least one entry recorded in a permit-all access log recording access of network traffic within a network according to a permit-all and log access policy;
   determining the first network traffic should be forwarded in the network based on a white-list security model;
   generating, in response to the determining, a first specific permit-access policy for the first network traffic;
   implementing the first specific permit-access policy generated for the first network traffic into the network by inserting the first specific permit-access policy ahead of the permit-all and log access policy;
   converting the permit-all and log access policy into a deny-all access policy; and
   applying a plurality of specific permit-access policies including the first specific permit-access policy before applying the permit-all and log access policy converted to the deny-all access policy to the network traffic using the permit-all access log recording in order to implement the white-list security model in the network.

2. The method of claim 1, wherein the identifying the first network traffic is based on a permit-all counter corresponding to the permit-all access log and maintained according to the permit-all and log access policy.

3. The method of claim 1, wherein the white-list security model includes a plurality of entities that are allowed to access the network.

4. The method of claim 1, further comprising
identifying, using the at least one processing device, second network traffic associated with at least one other entry recorded in the permit-all access log recording access of network traffic within a network according to the permit-all and log access policy;
determining, using the at least one processing device, if the second network traffic should be forwarded in the network based on the white-list security model;
if it is determined the second network traffic should be forwarded through the network based on the white-list security model, generating a second specific permit-access policy for the second network traffic; and
implementing, using the at least one processing device, the second specific permit-access policy generated for the second network traffic into the network by inserting the second specific permit-access policy ahead of the permit-all and log access policy.

5. The method of claim 4, further comprising:
removing the second specific permit-access policy generated for the second network traffic when a counter corresponding to the second specific permit-access policy generated for the second network traffic has not increased for a specific amount of time.

6. The method of claim 1, wherein identifying the first network traffic associated with at least one entry recorded in a permit-all access log comprises identifying an entry in a permit-all counter corresponding to the entry in the permit-all access log.

7. The method of claim 1, wherein the permit-all access log records access of the network traffic within the network using events in the network generated by one or more network assurance appliances.

8. The method of claim 1, further comprising refraining from generating the first specific permit-access policy for the first network traffic, if it is determined to refrain from forwarding the first network traffic through the network based on the white-list security model.

9. The method of claim 1, further comprising:
identifying, using the at least one processing device, second network traffic associated with at least one other entry recorded in the permit-all and log access log recording access of network traffic within a network according to the permit-all and log access policy;
determining, using the at least one processing device, if the second network traffic should be forwarded in the network based on the white-list security model;
if it is determined the second network traffic should not be forwarded through the network based on the white-list security model, refraining from generating a second specific permit access policy for the second network traffic; and
applying the plurality of specific permit-access policies including the first specific permit-access policy and lacking the second specific permit access policy before applying the permit-all access policy converted to the deny-all access policy to the network traffic to block forwarding of the second network traffic through the network.

10. A system comprising:
one or more processors; and
at least one non-transitory computer-readable storage medium having stored therein instructions which, when executed by the one or more processors, cause the one or more processors to perform operations comprising:
identifying first network traffic associated with at least one entry recorded in a permit-all access log recording access of network traffic within a network according to a permit-all and log access policy using events in the network generated by one or more network assurance appliances;
determining if the first network traffic should be forwarded in the network based on a white-list security model;
generating, in response to the determining, a first specific permit-access policy for the network traffic;
implementing the first specific permit-access policy generated for the first network traffic into the network by inserting the first specific permit-access policy ahead of the permit-all and log access policy;
converting the permit-all and log access policy into a deny-all access policy; and
applying a plurality of specific permit-access policies including the first specific permit-access policy before applying the permit-all and log access policy converted to the deny-all access policy to the network traffic using the permit-all access log recording in order to implement the white-list security model in the network.

11. The system of claim 10, wherein the instructions which, when executed by the one or more processors, further cause the one or more processors to perform operations comprising:
identifying second network traffic associated with at least one other entry recorded in the permit-all access log recording access of network traffic within a network according to the permit-all and log access policy;
determining if the second network traffic should be forwarded in the network based on the white-list security model;
if it is determined the second network traffic should be forwarded through the network based on the white-list security model, generating a second specific permit-access policy for the second network traffic; and
implementing the second specific permit-access policy generated for the second network traffic into the network by inserting the second specific permit-access policy ahead of the permit-all and log access policy.

12. The system of claim 10, wherein the instructions which, when executed by the one or more processors, further cause the one or more processors to perform operations comprising refraining from generating the first specific permit-access policy for the first network traffic, if it is determined to refrain from forwarding the first network traffic through the network based on the white-list security model.

13. The system of claim 10, wherein the instructions which, when executed by the one or more processors, further cause the one or more processors to perform operations comprising:
Identifying second network traffic associated with at least one other entry recorded in the permit-all access log recording access of network traffic within a network according to the permit-all and log access policy;
determining if the second network traffic should be forwarded in the network based on the white-list security model;

if it is determined the second network traffic should not be forwarded through the network based on the white-list security model, refraining from generating a second specific permit access policy for the second network traffic; and applying the plurality of specific permit-access policies including the first specific permit-access policy and lacking the second specific permit access policy before applying the permit-all and log access policy converted to the deny-all access policy to the network traffic to block forwarding of the second network traffic through the network.

14. A non-transitory computer-readable storage medium having stored therein instructions which, when executed by a processor, cause the processor to perform operations comprising:

identifying first network traffic associated with at least one entry recorded in a permit-all access log recording access of network traffic within a network according to a permit-all and log access policy;

determining if the first network traffic should be forwarded in the network based on a white-list security model;

generating, in response to the determining, a first specific permit-access policy for the first network traffic;

implementing the first specific permit-access policy generated for the first network traffic into the network by inserting the first specific permit-access policy ahead of the permit-all and log access policy;

converting the permit-all and log access policy into a deny-all access policy; and applying a plurality of specific permit-access policies including the first specific permit-access policy before applying the permit-all and log access policy converted to the deny-all access policy to the network traffic using the permit-all access log recording in order to implement the white-list security model in the network.

15. The non-transitory computer-readable storage medium of claim 14 having stored therein instructions which, when executed by the processor, further cause the processor to perform operations comprising:

identifying second network traffic associated with at least one other entry recorded in the permit-all access log recording access of network traffic within a network according to the permit-all and log access policy;

determining if the second network traffic should be forwarded in the network based on the white-list security model;

if it is determined the second network traffic should be forwarded through the network based on the white-list security model, generating a second specific permit-access policy for the second network traffic; and implementing the second specific permit-access policy generated for the second network traffic into the network by inserting the second specific permit-access policy ahead of the permit-all and log access policy.

16. The non-transitory computer-readable storage medium of claim 14 having stored therein instructions which, when executed by the processor, further cause the processor to perform operations comprising refraining from generating the first specific permit-access policy for the first network traffic, if it is determined to refrain from forwarding the first network traffic through the network based on the white-list security model.

17. The non-transitory computer-readable storage medium of claim 14 having stored therein instructions which, when executed by the processor, further cause the processor to perform operations comprising:

identifying second network traffic associated with at least one other entry recorded in the permit-all access log recording access of network traffic within a network according to the permit-all and log access policy;

determining if the second network traffic should be forwarded in the network based on the white-list security model;

if it is determined the second network traffic should not be forwarded through the network based on the white-list security model, refraining from generating a second specific permit access policy for the second network traffic; and applying the plurality of specific permit-access policies including the first specific permit-access policy and lacking the second specific permit access policy before applying the permit-all and log access policy converted to the deny-all access policy to the network traffic to block forwarding of the second network traffic through the network.

* * * * *